United States Patent
Uchiumi et al.

(10) Patent No.: US 11,367,025 B2
(45) Date of Patent: Jun. 21, 2022

(54) ANALYSIS METHOD, ANALYSIS APPARATUS, AND NON-TRANSITORY COMPUTER-READABLE STORAGE MEDIUM FOR STORING PROGRAM

(71) Applicant: FUJITSU LIMITED, Kawasaki (JP)

(72) Inventors: Tetsuya Uchiumi, Kawasaki (JP); Yuji Saito, Yokohama (JP); Masahiro Asaoka, Kawasaki (JP); Reiko Kondo, Yamato (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 178 days.

(21) Appl. No.: 16/375,882

(22) Filed: Apr. 5, 2019

(65) Prior Publication Data

US 2019/0332980 A1 Oct. 31, 2019

(30) Foreign Application Priority Data

Apr. 26, 2018 (JP) .............................. JP2018-084738

(51) Int. Cl.
*G06F 40/279* (2020.01)
*G06Q 10/06* (2012.01)
(Continued)

(52) U.S. Cl.
CPC .............. *G06Q 10/063* (2013.01); *G06F 7/62* (2013.01); *G06F 16/355* (2019.01);
(Continued)

(58) Field of Classification Search
CPC .................................................. G06Q 10/063
See application file for complete search history.

(56) References Cited

U.S. PATENT DOCUMENTS 5,697,844 A * 12/1997 Von Kohorn ....... G07F 17/3262
463/40
6,148,291 A * 11/2000 Radican ................. G06Q 10/08
705/22

(Continued)

FOREIGN PATENT DOCUMENTS

CN 104137128 A * 11/2014 ......... G06Q 10/0635
EP 1406198 A2 * 4/2004 ............. A61B 5/044

(Continued)

OTHER PUBLICATIONS

Anna L. Nuczak, A Survey of Data Mining and Machine Learning Methods for Cyber Security Instrusion Detection, , Second Quarter 2016, IEEE Communications Surveys & Tutorials, vol. 18, No. 2.*

*Primary Examiner* — Jerry O'Connor
*Assistant Examiner* — Philip N Warner
(74) *Attorney, Agent, or Firm* — Fujitsu Patent Center

(57) ABSTRACT

An analysis method includes: executing first accumulation processing for accumulating analysis reports including an analysis item regarding an analysis target and analysis results with respect to the analysis item; executing first extraction processing for extracting the analysis item and texts representing the analysis results from each of the analysis reports accumulated; executing first identification processing for identifying analysis techniques corresponding to the texts extracted; executing generation processing for generating analysis patterns; executing second identification processing for identifying first analysis patterns; executing third identification processing for identifying other analysis patterns; executing second accumulation processing for accumulating pattern information; executing second extraction processing for extracting the analysis item and the texts from a new analysis report; and executing output processing for identifying an analysis technique.

12 Claims, 28 Drawing Sheets

(51) Int. Cl.
*G06V 10/70* (2022.01)
*G06N 5/02* (2006.01)
*G06F 7/62* (2006.01)
*G06K 9/62* (2022.01)
*G06F 16/35* (2019.01)

(52) U.S. Cl.
CPC ......... *G06F 40/279* (2020.01); *G06K 9/6227* (2013.01); *G06N 5/027* (2013.01); *G06V 10/768* (2022.01)

(56) References Cited

U.S. PATENT DOCUMENTS

| | | | | |
|---|---|---|---|---|
| 8,090,592 | B1* | 1/2012 | Goodall | G06Q 10/063 705/2 |
| 8,738,414 | B1* | 5/2014 | Nagar | G06Q 10/101 705/7.25 |
| 9,569,729 | B1* | 2/2017 | Oehrle | G06Q 10/063 |
| 10,324,965 | B2* | 6/2019 | Bhatia | G06F 40/284 |
| 2003/0023334 | A1* | 1/2003 | Miyazaki | G05B 19/41865 700/96 |
| 2003/0149586 | A1* | 8/2003 | Chen | G06F 16/35 705/400 |
| 2006/0080361 | A1* | 4/2006 | Suzuki | G06F 40/131 707/E17.084 |
| 2007/0192128 | A1* | 8/2007 | Celestini | G06Q 40/00 705/35 |
| 2007/0192279 | A1* | 8/2007 | Van Luchene | G06Q 10/087 |
| 2008/0109289 | A1* | 5/2008 | Vivadelli | G06Q 50/163 705/314 |
| 2014/0278448 | A1* | 9/2014 | Sadeghi | G06Q 10/10 705/2 |
| 2015/0012317 | A1* | 1/2015 | Watanabe | G06Q 10/063 705/7.11 |
| 2015/0039357 | A1* | 2/2015 | Segal | G06Q 50/01 705/5 |
| 2015/0302303 | A1* | 10/2015 | Hakim | G06Q 10/063 706/11 |
| 2019/0114420 | A1* | 4/2019 | Chistyakov | G06N 20/00 |
| 2019/0339675 | A1* | 11/2019 | Maeda | G06Q 50/04 |
| 2019/0340547 | A1* | 11/2019 | Maeda | G06F 11/36 |
| 2020/0089200 | A1* | 3/2020 | Ootake | G06Q 10/08 |

FOREIGN PATENT DOCUMENTS

| | | | |
|---|---|---|---|
| JP | 2005115468 A | * | 4/2005 |
| JP | 2006215798 A | * | 8/2006 |
| JP | 2016-151987 | | 8/2016 |
| JP | 2017-084270 | | 5/2017 |
| WO | WO-2017168524 A1 | * | 10/2017 ............ G06F 16/00 |

* cited by examiner

FIG. 17A

ABOUT DISK I/O

LOAD IS HIGH OVER SEPTEMBER 1 TO SEPTEMBER 3
PEAK OCCURS AT MIDNIGHT EVERY DAY
EXCESS OF THRESHOLD HAS NOT OCCURRED

FIG. 17B

ABOUT DISK I/O

LOAD IS HIGH OVER APRIL 3, 10, 17, AND 24
PEAK OCCURS FROM 12 TO 13 O'CLOCK EVERY SATURDAY
EXCESS OF THRESHOLD HAS NOT OCCURRED

FIG. 17C

ABOUT DISK I/O

LOAD IS HIGH OVER FEBRUARY 27 AND FEBRUARY 28
PERIODICITY IS NOT FOUND
FREQUENCY OF EXCESS OF THRESHOLD IS HIGH ON FEBRUARY 28
THRESHOLD IS EXCEEDED FOR UP TO TEN MINUTES

FIG. 17D

ABOUT DISK I/O

LOAD IS HIGH OVER JUNE 1 TO 3
PEAK OCCURS FROM 9 O'CLOCK TO 10 O'CLOCK EVERY DAY
FREQUENCY OF EXCESS OF THRESHOLD IS HIGH ON JUNE 1
THRESHOLD IS EXCEEDED FOR UP TO FIVE MINUTES

FIG. 18

| ITEM NUMBER | ITEM NUMBER | ANALYSIS TECHNIQUE | ANALYSIS ID |
|---|---|---|---|
| 1 | *LOAD IS HIGH* ON [DATE] | TIME TREND ANALYSIS | 1 |
| 2 | *PEAK* AT [CYCLE] [TIME] | CYCLE ANALYSIS | 2 |
| 3 | *LOAD IS LOW* ON [DATE] | TIME TREND ANALYSIS | 1 |
| 4 | *CYCLE* | TIME TREND ANALYSIS | 2 |
| 5 | *THRESHOLD* ON [DATE] | THRESHOLD EXCESS FREQUENCY ANALYSIS | 3 |
| 6 | *THRESHOLD* FOR [PERIOD] | THRESHOLD EXCESS PERIOD ANALYSIS | 4 |
| ... | ... | ... | ... |

FIG. 19A

LOAD IS HIGH OVER [DATE]
PEAK OCCURS AT [CYCLE] [CLOCK TIME]
EXCESS OF THRESHOLD HAS NOT OCCURRED

FIG. 19B

LOAD IS HIGH OVER [DATE]
PEAK OCCURS AT [CYCLE] [CLOCK TIME]
EXCESS OF THRESHOLD HAS NOT OCCURRED

FIG. 19C

LOAD IS HIGH OVER [DATE]
PERIODICITY IS NOT FOUND
FREQUENCY OF EXCESS OF THRESHOLD IS HIGH ON [DATE]
THRESHOLD IS EXCEEDED FOR UP TO [PERIOD]

FIG. 19D

LOAD IS HIGH OVER [DATE]
PEAK OCCURS AT [CYCLE] [CLOCK TIME]
FREQUENCY OF EXCESS OF THRESHOLD IS HIGH ON [DATE]
THRESHOLD IS EXCEEDED FOR UP TO [PERIOD]

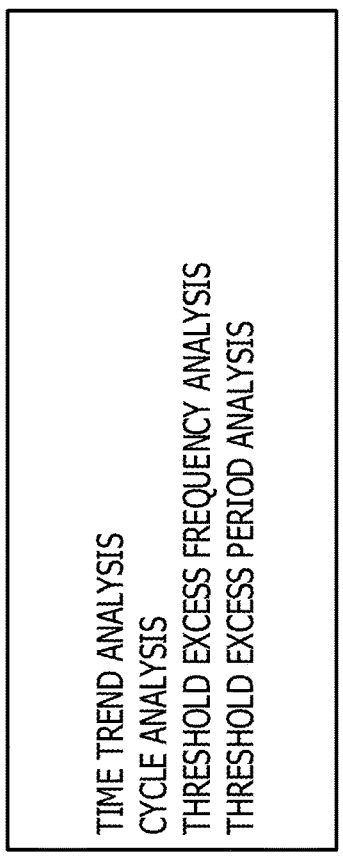

FIG. 20A

TIME TREND ANALYSIS
CYCLE ANALYSIS
THRESHOLD EXCESS FREQUENCY ANALYSIS

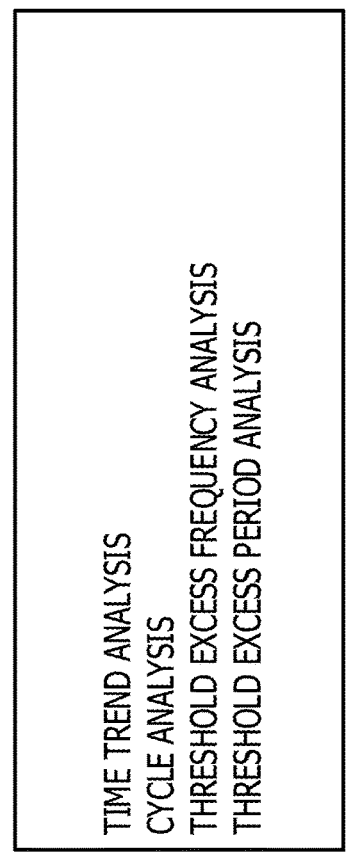

FIG. 20C

TIME TREND ANALYSIS
CYCLE ANALYSIS
THRESHOLD EXCESS FREQUENCY ANALYSIS
THRESHOLD EXCESS PERIOD ANALYSIS

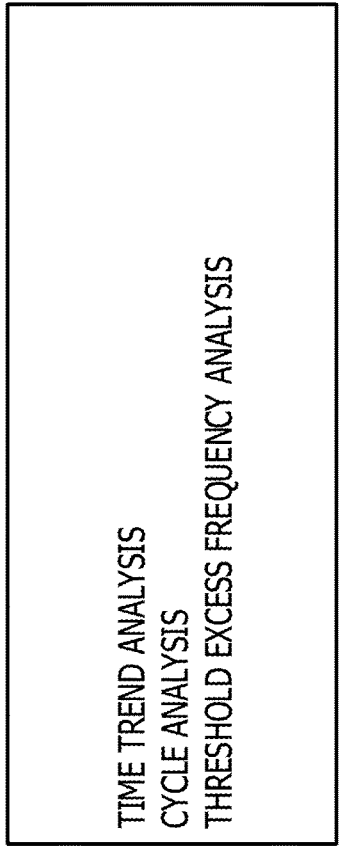

FIG. 20B

TIME TREND ANALYSIS
CYCLE ANALYSIS
THRESHOLD EXCESS FREQUENCY ANALYSIS

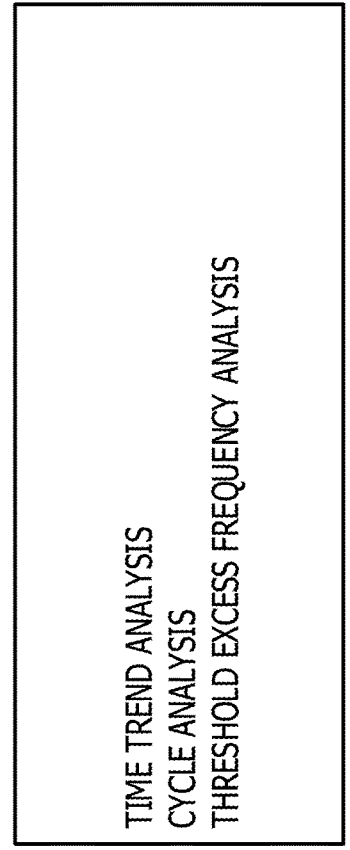

FIG. 20D

TIME TREND ANALYSIS
CYCLE ANALYSIS
THRESHOLD EXCESS FREQUENCY ANALYSIS
THRESHOLD EXCESS PERIOD ANALYSIS

FIG. 21

| ITEM NUMBER | REPORT ID | ANALYSIS ITEM | TEXT | ANALYSIS ID | ANALYSIS PATTERN ID |
|---|---|---|---|---|---|
| 1 | 1 | DISK I/O | LOAD IS HIGH OVER [DATE] | 1 | 1 |
| 2 | 1 | DISK I/O | PEAK OCCURS AT [CYCLE] [CLOCK TIME] | 2 | 2 |
| 3 | 1 | DISK I/O | EXCESS OF THRESHOLD HAS NOT OCCURRED | 3 | 3 |
| 4 | 2 | DISK I/O | LOAD IS HIGH OVER [DATE] | 1 | 1 |
| 5 | 2 | DISK I/O | PEAK OCCURS AT [CYCLE] [CLOCK TIME] | 2 | 2 |
| 6 | 2 | DISK I/O | EXCESS OF THRESHOLD HAS NOT OCCURRED | 3 | 3 |
| 7 | 3 | DISK I/O | LOAD IS HIGH OVER [DATE] | 1 | 1 |
| 8 | 3 | DISK I/O | PERIODICITY IS NOT FOUND | 2 | 4 |
| 9 | 3 | DISK I/O | FREQUENCY OF EXCESS OF THRESHOLD IS HIGH ON [DATE] | 3 | 5 |
| 10 | 3 | DISK I/O | THRESHOLD IS EXCEEDED FOR UP TO [PERIOD] | 4 | 6 |
| 11 | 4 | DISK I/O | LOAD IS HIGH OVER [DATE] | 1 | 1 |
| 12 | 4 | DISK I/O | PEAK OCCURS AT [CYCLE] [CLOCK TIME] | 2 | 2 |
| 13 | 4 | DISK I/O | FREQUENCY OF EXCESS OF THRESHOLD IS HIGH ON [DATE] | 3 | 5 |
| 14 | 4 | DISK I/O | THRESHOLD IS EXCEEDED FOR UP TO [PERIOD] | 4 | 6 |

FIG. 22

| ITEM NUMBER | USE PURPOSE | BUSINESS TYPE |
|---|---|---|
| 1 | MONITORING | INTRA-COMPANY SYSTEM |
| 2 | COPING WITH FAILURE | ONLINE SHOP |
| 3 | MONITORING | SOCIAL-NETWORK GAME |
| ... | ... | ... |

FIG. 23

| ITEM NUMBER | ANALYSIS ID | ANALYSIS ITEM | TEXT | REGISTRATION DATE |
|---|---|---|---|---|
| 1 | 4 | DISK I/O | THRESHOLD IS EXCEEDED FOR UP TO [PERIOD] | 2017/10/01 |

FIG. 24

| ITEM NUMBER | REPORT ID | ANALYSIS ITEM | TEXT | ANALYSIS ID | ANALYSIS PATTERN ID |
|---|---|---|---|---|---|
| 1 | 3,4 | DISK I/O | LOAD IS HIGH OVER [DATE] | 1 | 1 |
| 2 | 3,4 | DISK I/O | FREQUENCY OF EXCESS OF THRESHOLD IS HIGH ON [DATE] | 3 | 5 |

FIG. 25

| ITEM NUMBER | REPORT ID | ANALYSIS ITEM | TEXT | ANALYSIS ID | ANALYSIS PATTERN ID |
|---|---|---|---|---|---|
| 2 | 3,4 | DISK I/O | FREQUENCY OF EXCESS OF THRESHOLD IS HIGH ON [DATE] | 3 | 5 |

FIG. 26

| ITEM NUMBER | USE PURPOSE | BUSINESS TYPE | OPTION PATTERN ID | TRIGGER PATTERN ID | REGISTRATION DATE |
|---|---|---|---|---|---|
| 1 | MONITORING | INTRA-COMPANY SYSTEM | 4 | 5 | 201/10/01 |

FIG. 27A

```
ABOUT DISK I/O

LOAD IS HIGH ON AUGUST 20
PERIODICITY IS NOT FOUND
FREQUENCY OF EXCESS OF THRESHOLD IS HIGH ON AUGUST 20
```

FIG. 27B

```
LOAD IS HIGH OVER [DATE]
PERIODICITY IS NOT FOUND
FREQUENCY OF EXCESS OF THRESHOLD IS HIGH ON [DATE]
```

FIG. 28

ABOUT DISK I/O

LOAD IS HIGH ON AUGUST 20
PERIODICITY IS NOT FOUND
FREQUENCY OF EXCESS OF THRESHOLD IS HIGH ON AUGUST 20
THRESHOLD IS EXCEEDED FOR UP TO 15 MINUTES

ANALYSIS METHOD, ANALYSIS APPARATUS, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-84738, filed on Apr. 26, 2018, the entire contents of which are incorporated herein by reference.

FIELD

The embodiments discussed herein are related to an analysis method, an analysis apparatus, and a non-transitory computer-readable storage medium for storing a program.

BACKGROUND

For example, a business operator that provides services to users (hereinafter, referred to also as business operator simply) constructs and operates an information processing system for providing the services. For example, the business operator constructs an information processing system that carries out analysis regarding another information processing system (hereinafter, referred to also as analysis target).

In such an information processing system, for example, analysis by use of an analysis technique included in a template prepared in advance is automatically carried out according to input of various kinds of information corresponding to an analysis item of the analysis target, and so forth. This allows the business operator to suppress the occurrence of variation in the accuracy of the analysis depending on the skills of a person in charge who analyzes the analysis target, and so forth, for example. Furthermore, it becomes possible for the business operator to alleviate the burden of work for the analysis of the analysis target.

Examples of the related art include Japanese Laid-open Patent Publication No. 2017-084270 and Japanese Laid-open Patent Publication No. 2016-151987.

SUMMARY

According to an aspect of the embodiments, an analysis method includes: executing first accumulation processing that includes accumulating, in a storing unit, analysis reports including an analysis item regarding an analysis target and analysis results with respect to the analysis item; executing first extraction processing that includes extracting the analysis item and texts representing the analysis results from each of the analysis reports accumulated; executing first identification processing that includes referring to the storing unit that stores correspondence information in which texts are associated with analysis techniques corresponding to the texts and identifying analysis techniques corresponding to the texts extracted; executing generation processing that includes generating analysis patterns including the analysis items extracted, the texts extracted, and the analysis techniques identified; executing second identification processing that includes identifying first analysis patterns including an analysis technique whose appearance frequency is equal to or lower than a threshold in the analysis patterns generated; executing third identification processing that includes identifying other analysis patterns included in same analysis reports as the first analysis patterns identified and identifying second analysis patterns in which the analysis item and the text are common among the analysis reports including the first analysis patterns identified in the other analysis patterns identified; executing second accumulation processing that includes accumulating, in the storing unit, pattern information in which the analysis technique included in the first analysis patterns identified is associated with the second analysis pattern identified; executing second extraction processing that includes extracting the analysis item and the texts from a new analysis report in response to acceptance of the new analysis report; and executing output processing that includes referring to the storing unit that stores the pattern information accumulated and identifying an analysis technique corresponding to the second analysis pattern including the analysis item and the text extracted in the second analysis patterns identified and outputting an analysis result of the analysis target based on the analysis technique identified in association with the new analysis report.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 17A to 17D explain concrete examples of an analysis report;

FIG. 18 explains a concrete example of correspondence information;

FIGS. 19A to 19D explain concrete examples of processing of S53;

FIGS. 20A to 20D explain concrete examples of processing of S53;

FIG. 21 explains a concrete example of an analysis pattern;

FIG. 22 explains a concrete example of tag information;

FIG. 23 explains a concrete example of an option pattern;

FIG. 24 explains a concrete example of a trigger pattern;

FIG. 25 explains a concrete example of a trigger pattern;

FIG. 26 explains a concrete example of pattern information;

FIGS. 27A and 27B explain details of analysis processing in the first embodiment; and FIG. 28 explains details of analysis processing in the first embodiment.

DESCRIPTION OF EMBODIMENTS

Here, if it is determined that a given abnormality has occurred in an analysis target as the result of analysis of the analysis target, the business operator is desired to carry out further analysis of the analysis target by using an analysis technique other than the analysis techniques included in the template (hereinafter, referred to also as additional analysis technique), for example. For this reason, in this case, the business operator is desired to carry out decision of the additional analysis technique according to the analysis result of the analysis target, and so forth, and it is difficult to alleviate the burden of work for the analysis of the analysis target in some cases.

Thus, in one aspect, the embodiments discussed herein intend to provide analysis program and analysis method that allow alleviation of the burden of work accompanying analysis of an analysis target.

[Configuration of Information Processing System]

Figure 1:
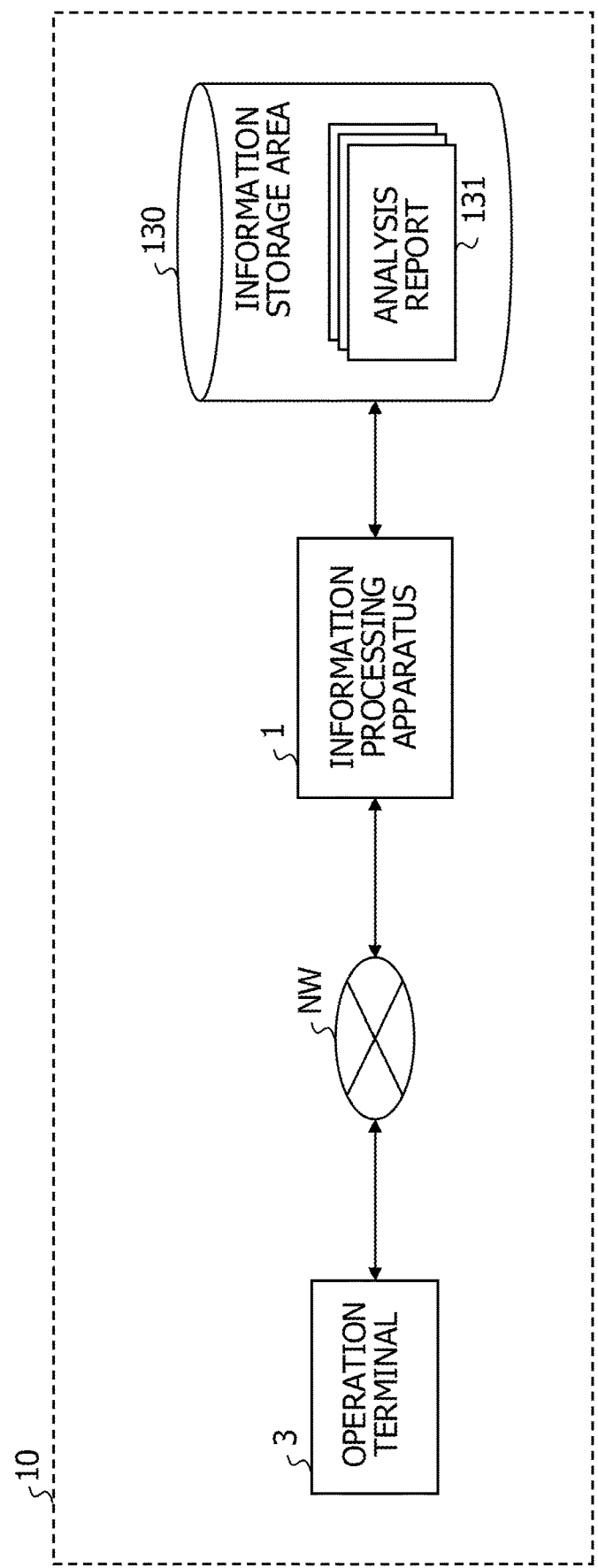
FIG. 1 illustrates a configuration of an information processing system.

FIG. 1 is a diagram illustrating a configuration of an information processing system. An information processing system 10 illustrated in FIG. 1 includes an information processing apparatus 1, an information storage area 130, and an operation terminal 3. The information storage area 130 may be a storage area included in a storing apparatus (not illustrated) located outside the information processing apparatus 1 or may be a storage area located inside the information processing apparatus 1. Furthermore, the information processing apparatus 1 and the operation terminal 3 are coupled through a network NW.

The operation terminal 3 is a personal computer (PC) used by a business operator, for example, and transmits information input by the business operator to the information processing apparatus 1.

For example, in response to transmission of information corresponding to an analysis item of an analysis target from the operation terminal 3, the information processing apparatus 1 carries out analysis regarding the analysis item of the analysis target.

For example, if the information corresponding to the analysis item of the analysis target is transmitted from the operation terminal 3, the information processing apparatus 1 carries out the analysis regarding the analysis item of the analysis target by using an analysis technique included in a template prepared in advance. Then, for example, the information processing apparatus 1 creates information including the analysis item of the analysis target and analysis results regarding the analysis item (hereinafter, referred to also as analysis report 131) and stores the information in the information storage area 130.

This allows the business operator to suppress the occurrence of variation in the accuracy of the analysis depending on the skills of a person in charge who analyzes the analysis target, and so forth, for example. Furthermore, it becomes possible for the business operator to alleviate the burden of work for the analysis of the analysis target.

Here, if determining that there is a possibility that a given abnormality is included in the analysis target as the result of checking the contents of the analysis report 131, the business operator is desired to carry out decision of an additional analysis technique and so forth in order to cause the information processing apparatus 1 to carry out further analysis. For this reason, even in the case of analyzing the analysis target by using the template, it is difficult for the business operator to alleviate the burden of work accompanying the analysis of the analysis target in some cases.

Thus, the information processing apparatus 1 in the present embodiment accumulates the analysis reports 131 regarding the analysis target in the information storage area 130 and extracts the analysis item and texts representing analysis results included in the analysis report 131 from each of the accumulated analysis reports 131.

Then, the information processing apparatus 1 refers to the information storage area 130 that stores correspondence information in which texts are associated with analysis techniques corresponding to the texts and identifies the analysis techniques corresponding to the extracted texts to generate analysis patterns including the extracted analysis items, the extracted texts, and the identified analysis techniques.

Subsequently, the information processing apparatus 1 identifies analysis patterns including the analysis technique whose appearance frequency is equal to or lower than a threshold (hereinafter, referred to also as first analysis patterns or option patterns) in the generated analysis patterns. Then, the information processing apparatus 1 identifies other analysis patterns included in the same analysis reports as the identified option patterns and identifies analysis patterns in which the analysis item and the text are common among the analysis reports including the identified option patterns (hereinafter, referred to also as second analysis patterns or trigger patterns) in the identified other analysis patterns. Moreover, the information processing apparatus 1 accumulates, in the information storage area 130, pieces of pattern information in which the analysis technique included in the identified option patterns is associated with the identified trigger pattern.

Thereafter, in response to acceptance of the new analysis report 131, the information processing apparatus 1 extracts the analysis item and texts from the new analysis report 131. Then, the information processing apparatus 1 refers to the information storage area 130 that stores the accumulated pieces of pattern information and identifies the analysis technique corresponding to the trigger pattern including the extracted analysis item and text in the identified trigger patterns. Moreover, the information processing apparatus 1 outputs the analysis result of the analysis target based on the identified analysis technique in association with the new analysis report 131.

For example, it is possible to determine that the analysis pattern including the analysis technique whose appearance frequency is equal to or lower than the threshold has a high possibility of being the option pattern including an additional analysis technique selected by the business operator in the past. For this reason, the information processing apparatus 1 identifies the analysis pattern including the analysis technique whose appearance frequency is equal to or lower than the threshold as the option pattern.

Furthermore, it is possible to determine that the trigger pattern that has served as a trigger for carrying out analysis by an additional analysis technique has a high possibility of being included in other analysis patterns included in the same analysis report as the option pattern. For this reason, the information processing apparatus 1 identifies, as the trigger patterns, the analysis patterns in which the analysis item and the text are common among the analysis reports including the option patterns in the other analysis patterns included in the same analysis reports as the option patterns. Then, the information processing apparatus 1 accumulates pieces of pattern information in which the analysis technique included in the identified option patterns is associated with the identified trigger pattern.

Due to this, when determining that the trigger pattern corresponding to the new analysis report 131 exists, the information processing apparatus 1 may identify the analysis technique of the option pattern corresponding to the trigger pattern determined to exist as the additional analysis technique by referring to the storing unit in which the pieces of pattern information are accumulated. For this reason, it becomes possible for the information processing apparatus 1 to automatically carry out analysis using the analysis technique included in the template, and besides, analysis using the additional analysis technique when analyzing the analysis target. Therefore, it becomes possible for the business operator to alleviate the burden of work accompanying decision of the additional analysis technique and so forth and to alleviate the burden of work for the analysis of the analysis target.

[Hardware Configuration of Information Processing System]

Figure 2:
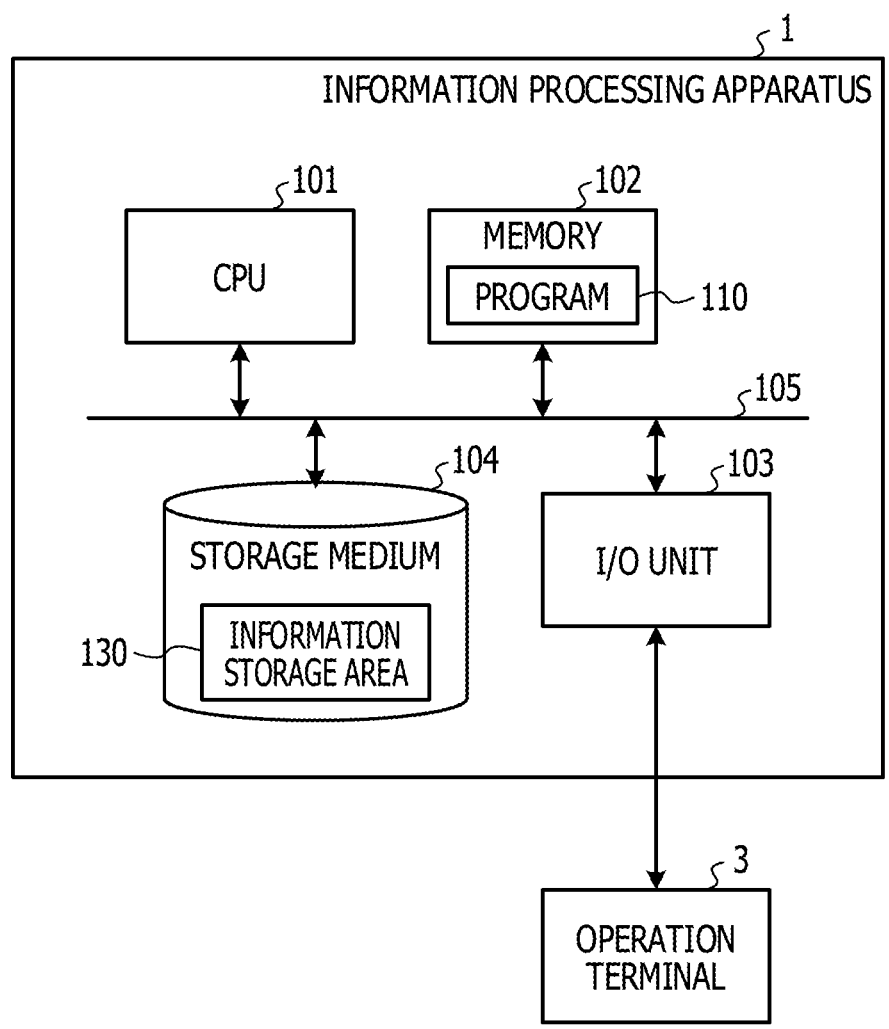
FIG. 2 illustrates a hardware configuration of an information processing apparatus.

Next, the hardware configuration of the information processing system 10 will be described. FIG. 2 is a diagram illustrating a hardware configuration of an information processing apparatus.

An information processing apparatus 1 illustrated in FIG. 2 includes a central processing unit (CPU) 101 that is a processor, a memory 102, an external interface (I/O unit) 103, and a storage medium 104. The respective units are coupled to each other through a bus 105.

The storage medium 104 includes a program storage area (not illustrated) that stores a program 110 for executing processing of analyzing an analysis target (hereinafter, referred to also as analysis processing), for example. Furthermore, the storage medium 104 includes the information storage area 130 (hereinafter, referred to also as storing unit 130) that stores information used when the analysis processing is executed, for example. The storage medium 104 may be a hard disk drive (HDD), for example.

The CPU 101 executes the program 110 loaded from the storage medium 104 into the memory 102 and executes the analysis processing.

The external interface 103 communicates with the operation terminal 3, for example.

[Functions of Information Processing System]

Figure 3:
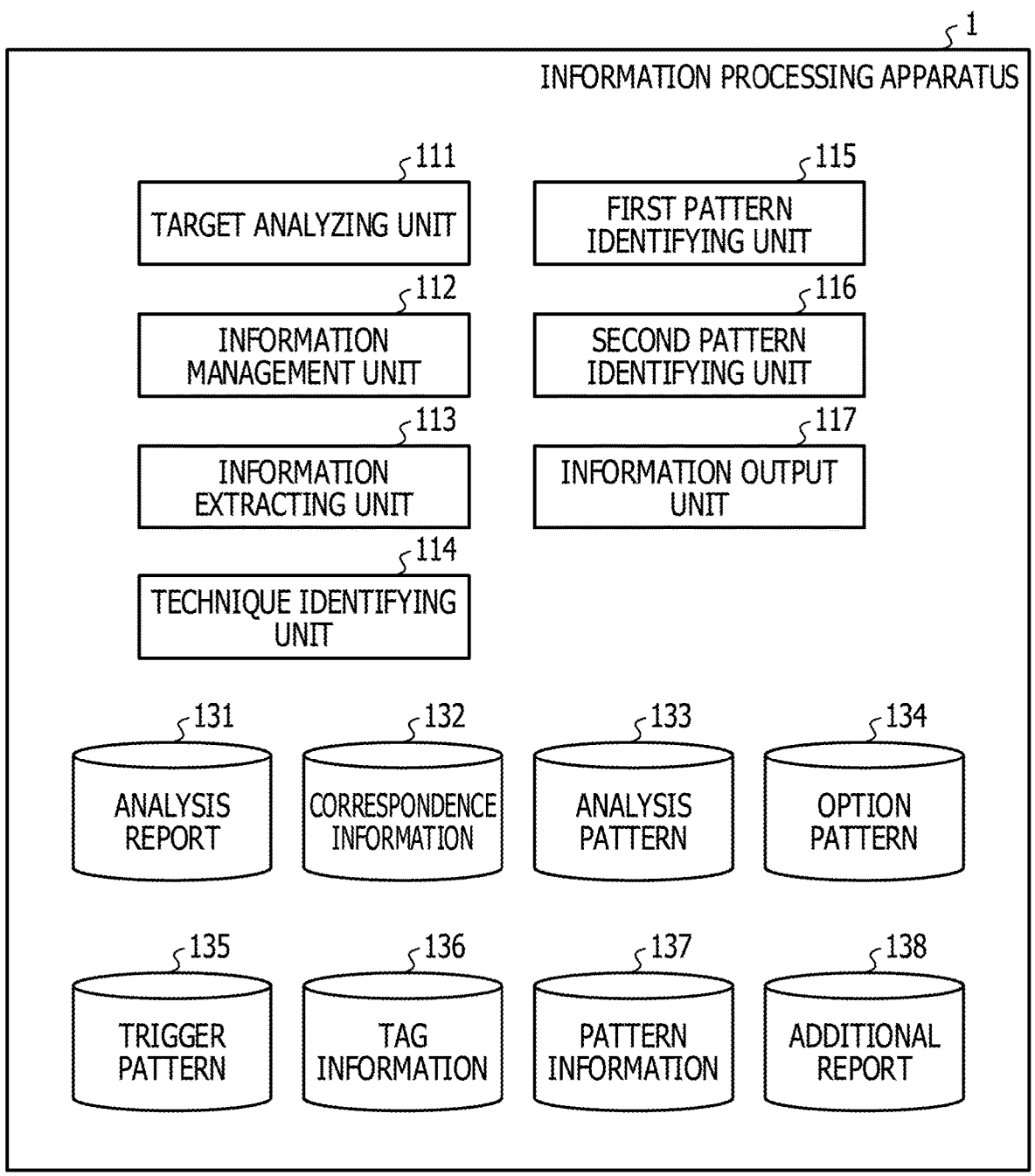
FIG. 3 is a block diagram of functions of an information processing apparatus.

Next, functions of the information processing system 10 will be described. FIG. 3 is a block diagram of functions of an information processing apparatus.

Through organic cooperation between hardware such as the CPU 101 and the memory 102 and the program 110, an information processing apparatus 1 illustrated in FIG. 3 implements various kinds of functions including a target analyzing unit 111, an information management unit 112, an information extracting unit 113, a technique identifying unit 114, a first pattern identifying unit 115, a second pattern identifying unit 116, and an information output unit 117.

Furthermore, as illustrated in FIG. 3, the information processing apparatus 1 stores, in the information storage area 130, the analysis reports 131, correspondence information 132, analysis patterns 133, option patterns 134, trigger patterns 135, tag information 136, pattern information 137, and additional reports 138.

The target analyzing unit 111 carries out analysis regarding an analysis item of an analysis target in response to reception of information corresponding to the analysis item of the analysis target from the operation terminal 3, for example. For example, the target analyzing unit 111 carries out the analysis regarding the analysis item of the analysis target by using an analysis technique included in a template prepared in advance. Then, the target analyzing unit 111 creates the analysis reports 131 including analysis results regarding the analysis item of the analysis target. Thereafter, the information management unit 112 stores (accumulates) the analysis reports 131 created by the target analyzing unit 111 in the information storage area 130. A concrete example of the analysis report 131 will be described later.

The information extracting unit 113 extracts the analysis item and texts representing analysis results from each of the analysis reports 131 stored in the information storage area 130.

The technique identifying unit 114 refers to the information storage area 130 that stores the correspondence information 132 in which texts are associated with analysis techniques corresponding to the texts and identifies the analysis techniques corresponding to the texts extracted by the information extracting unit 113. The correspondence information 132 may be stored in the information storage area 130 in advance by a business operator. Thereafter, the information management unit 112 generates the analysis patterns 133 including the analysis items extracted by the information extracting unit 113, the texts extracted by the information extracting unit 113, and the analysis techniques identified by the technique identifying unit 114 and stores the analysis patterns 133 in the information storage area 130. Concrete examples of the correspondence information 132 and the analysis pattern 133 will be described later.

The first pattern identifying unit 115 identifies the option patterns 134 including the analysis technique whose appearance frequency is equal to or lower than a threshold in the analysis patterns 133 generated by the information management unit 112. Then, the information management unit 112 stores the option patterns 134 identified by the first pattern identifying unit 115 in the information storage area 130. A concrete example of the option pattern 134 will be described later.

The second pattern identifying unit 116 identifies other analysis patterns 133 included in the same analysis reports 131 as the option patterns 134 identified by the first pattern identifying unit 115 and identifies the trigger patterns 135 in which the analysis item and the text are common among the analysis reports 131 including the option patterns 134 identified by the first pattern identifying unit 115 in the other analysis patterns 133 identified. Then, the information management unit 112 stores the trigger patterns 135 identified by the second pattern identifying unit 116 in the information storage area 130. Furthermore, the information management unit 112 stores (accumulates), in the information storage area 130, the pieces of pattern information 137 in which the analysis technique included in the option patterns 134 identified by the first pattern identifying unit 115 is associated with the trigger pattern 135 identified by the second pattern identifying unit 116. Concrete examples of the trigger pattern 135 and the pattern information 137 will be described later.

Thereafter, in response to acceptance of the new analysis report 131, the information extracting unit 113 extracts the analysis item and texts from the new analysis report 131. For example, the information extracting unit 113 extracts the analysis item and the texts from the new analysis report 131 in response to creation of the new analysis report 131 regarding the analysis target by the target analyzing unit 111. Then, the information management unit 112 refers to the information storage area 130 that stores the pieces of pattern information 137 and identifies the analysis technique corresponding to the trigger pattern 135 including the analysis item and the text extracted by the information extracting unit 113 in the trigger patterns 135 identified by the second pattern identifying unit 116. Moreover, the target analyzing unit 111 analyzes the analysis target by the analysis technique identified by the information management unit 112.

The information output unit 117 outputs the additional report 138 including the analysis result of the analysis target based on the analysis technique included in the option pattern 134 identified by the information management unit 112 in association with the new analysis report 131. A description of the tag information 136 will be made later.

[Outline of First Embodiment]

Figure 9:
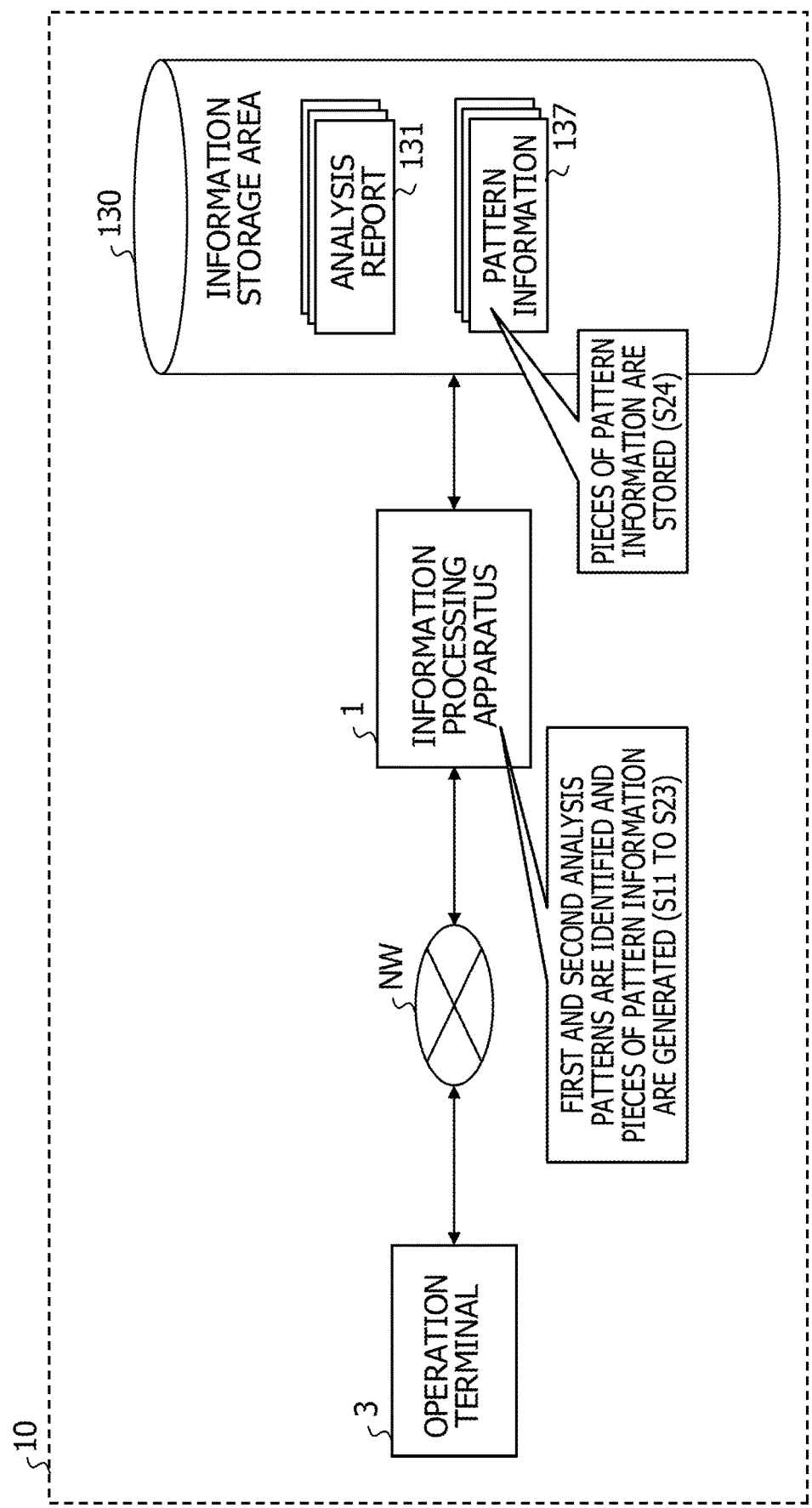
FIG. 9 explains an outline of analysis processing in the first embodiment.
Figure 10:
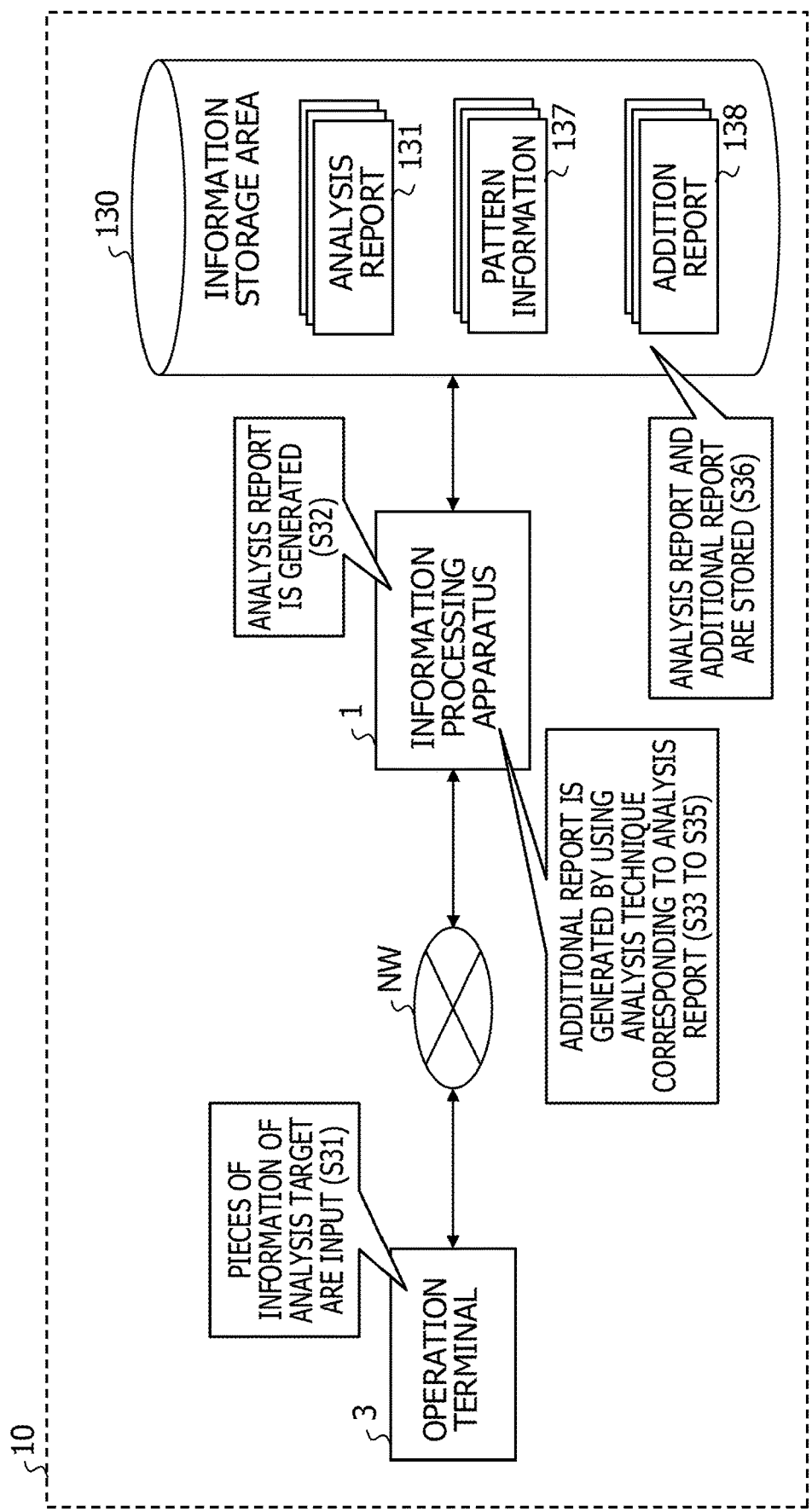
FIG. 10 explains an outline of analysis processing in the first embodiment.

Next, outlines of a first embodiment will be described. FIG. 4 to FIG. 7 are flowchart diagrams explaining outlines of analysis processing in the first embodiment. Furthermore, FIG. 8 to FIG. 10 are diagrams explaining outlines of analysis processing in the first embodiment.

Figure 4:
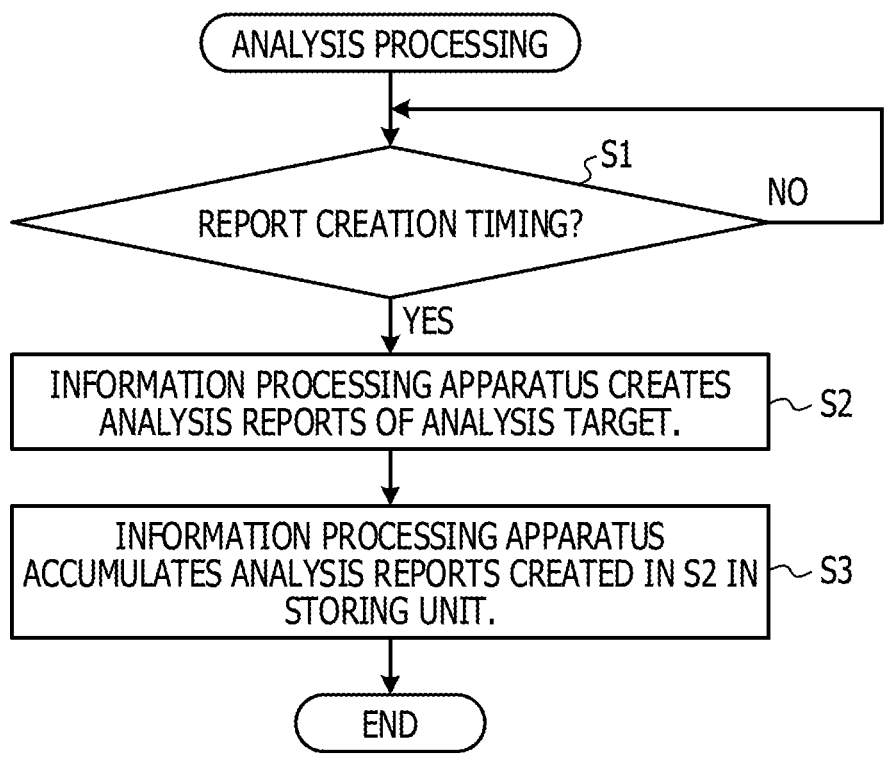
FIG. 4 is a flowchart diagram explaining an outline of analysis processing in a first embodiment.

As illustrated in FIG. 4, the information processing apparatus 1 waits until a report creation timing (NO of S1). The report creation timing is a timing set by a business operator in advance, for example.

Then, if the report creation timing has come (YES of S1), the information processing apparatus 1 creates the analysis reports 131 of the analysis target (S2). Thereafter, the information processing apparatus 1 accumulates the analysis reports 131 created in the processing of S2 in the information storage area 130 (S3).

Figure 8:
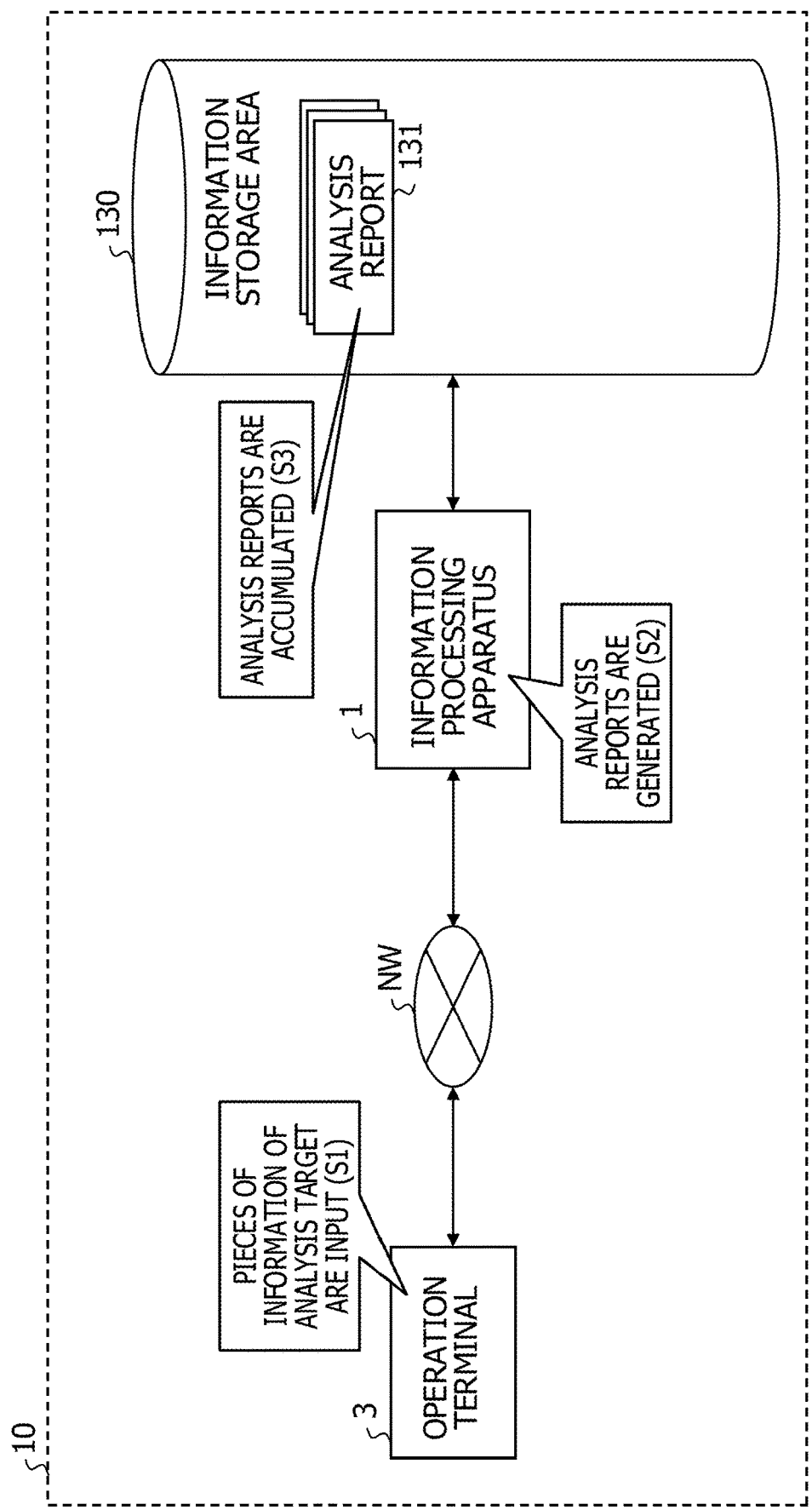
FIG. 8 explains an outline of analysis processing in the first embodiment.

For example, as illustrated in FIG. 8, the information processing apparatus 1 creates the analysis reports 131 of the analysis target in response to input of the respective pieces of information regarding an analysis item of the analysis target from the operation terminal 3 and accumulates the created analysis reports 131 in the information storage area 130.

Figure 5:
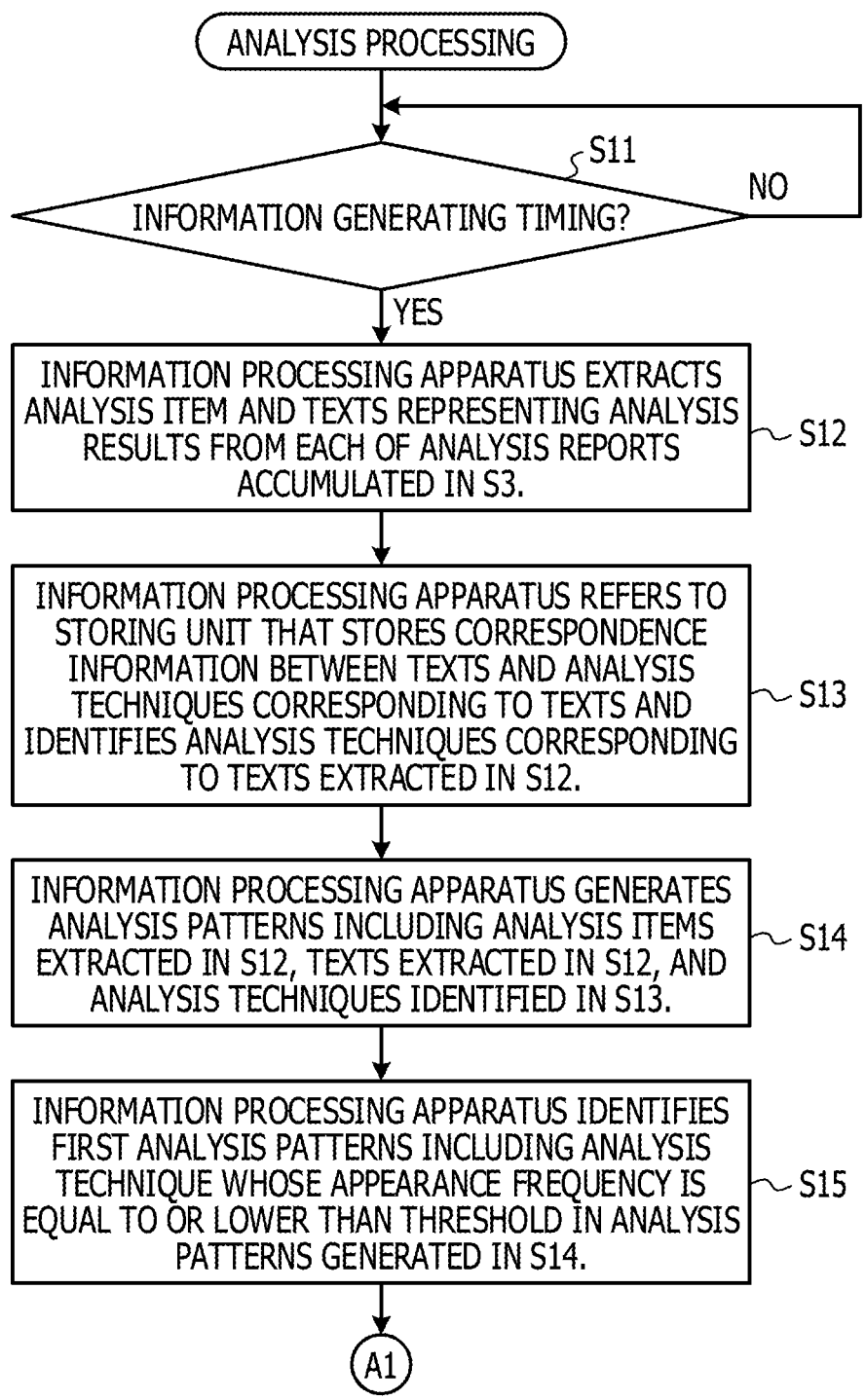
FIG. 5 is a flowchart diagram explaining an outline of analysis processing in the first embodiment.

Furthermore, as illustrated in FIG. 5, the information processing apparatus 1 waits until an information generation timing comes (NO of S11). The information generation timing is a timing set by the business operator in advance, for example.

Then, if the information generation timing has come (YES of S11), the information processing apparatus 1 extracts the analysis item and texts representing analysis results from each of the analysis reports 131 accumulated in the processing of S3 (S12).

Subsequently, the information processing apparatus 1 refers to the information storage area 130 that stores the correspondence information 132 in which texts are associated with analysis techniques corresponding to the texts and identifies the analysis techniques corresponding to the texts extracted in the processing of S12 (S13). Then, the information processing apparatus 1 generates the analysis patterns 133 including the analysis items extracted in the processing of S12, the texts extracted in the processing of S12, and the analysis techniques identified in the processing of S13 (S14). Moreover, the information processing apparatus 1 identifies the option patterns 134 including the analysis technique whose appearance frequency is equal to or lower than a threshold in the analysis patterns 133 generated in the processing of S14 (S15).

Figure 6:
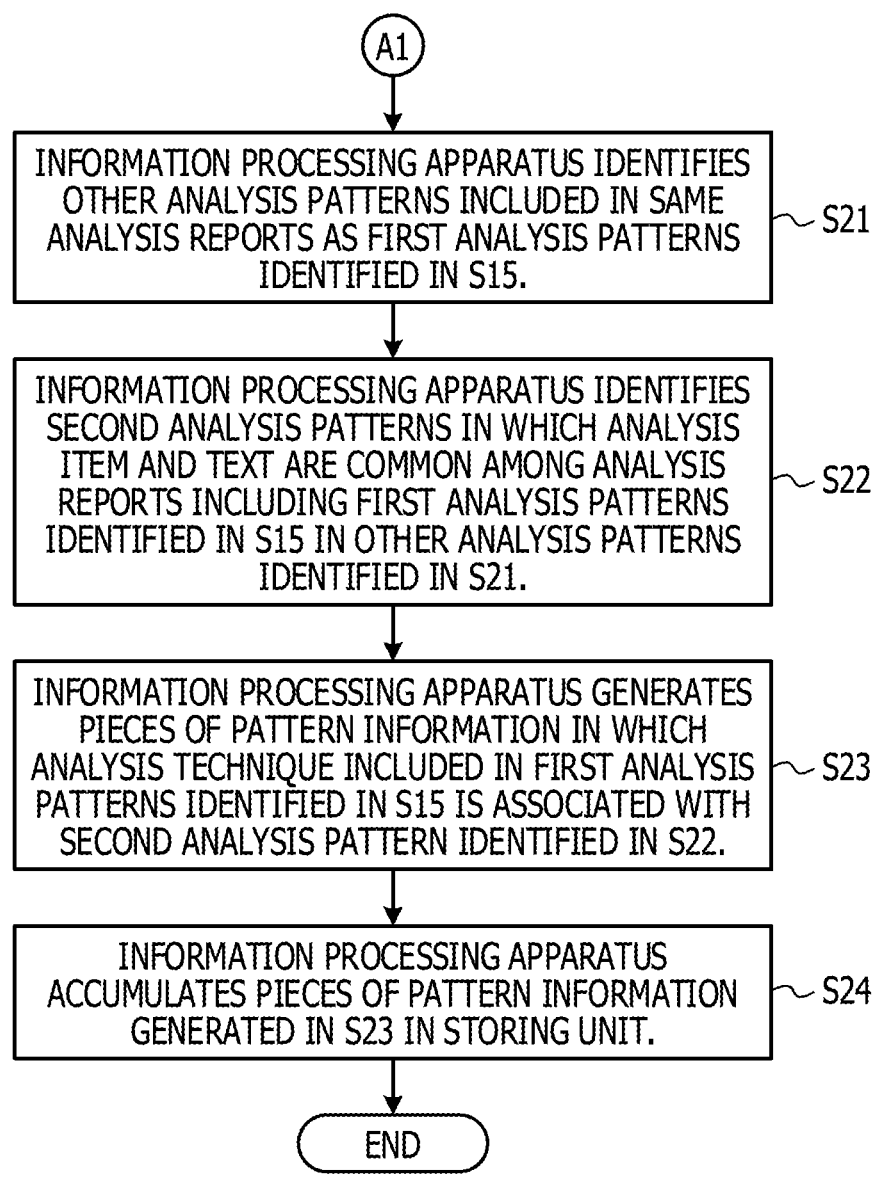
FIG. 6 is a flowchart diagram explaining an outline of analysis processing in the first embodiment.

Next, as illustrated in FIG. 6, the information processing apparatus 1 identifies other analysis patterns 133 included in the same analysis reports 131 as the option patterns 134 identified in the processing of S15 (S21). Then, the information processing apparatus 1 identifies the trigger patterns 135 in which the analysis item and the text are common among the analysis reports 131 including the option patterns 134 identified in the processing of S15 in the other analysis patterns 133 identified in the processing S21 (S22). Moreover, the information processing apparatus 1 generates pieces of pattern information 137 in which the analysis technique included in the option patterns 134 identified in the processing of S15 is associated with the trigger pattern 135 identified in the processing of S22 (S23) and accumulates the pieces of pattern information 137 in the information storage area 130 (S24).

For example, as illustrated in FIG. 9, the information processing apparatus 1 generates the pieces of pattern information 137 in response to input of information indicating intent to generate the pattern information 137 to the operation terminal 3 by the business operator.

Figure 7:
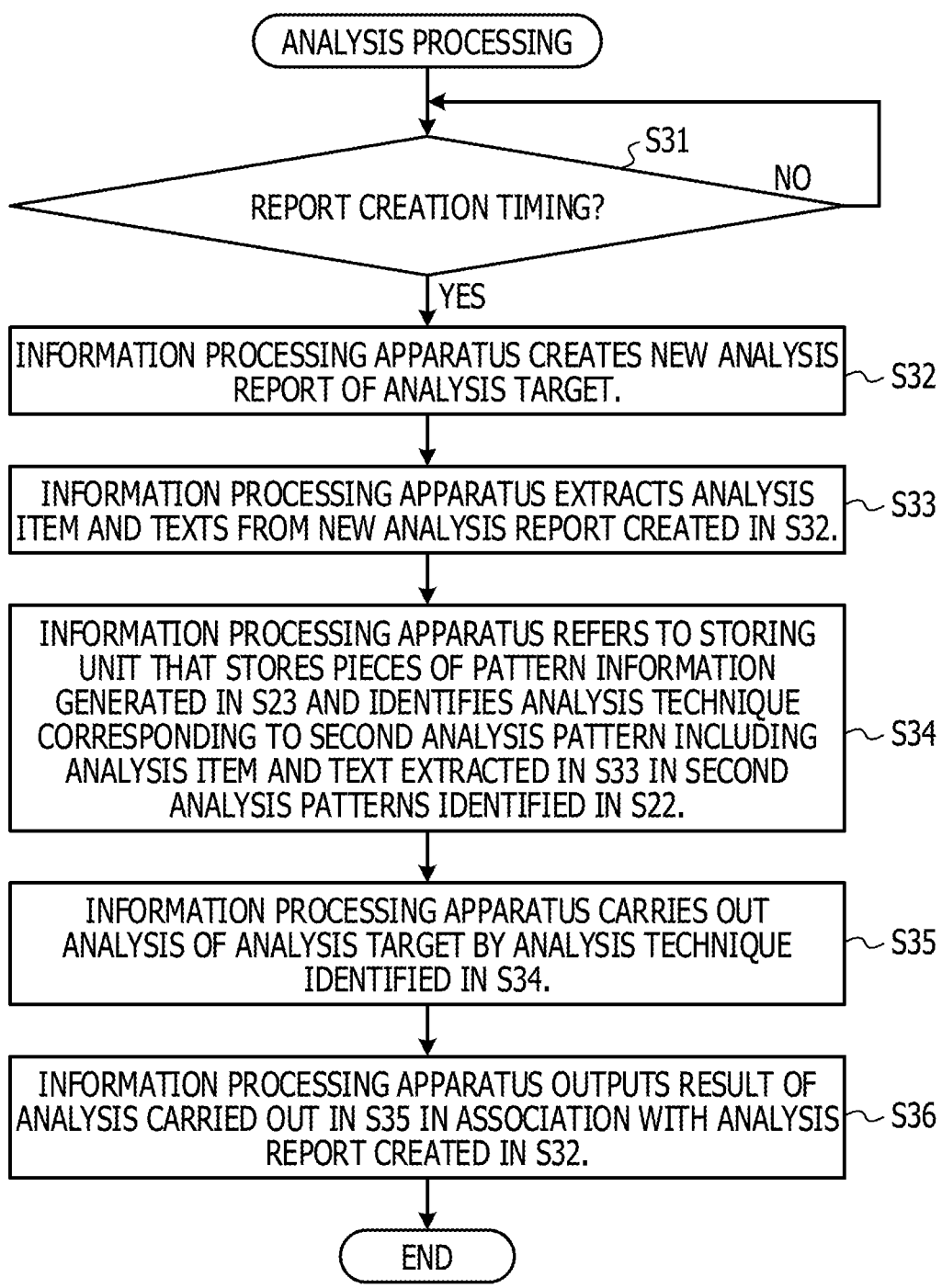
FIG. 7 is a flowchart diagram explaining an outline of analysis processing in the first embodiment.

Thereafter, as illustrated in FIG. 7, the information processing apparatus 1 waits until the report creation timing (NO of S31). Then, if the report creation timing has come (YES of S31), the information processing apparatus 1 creates the new analysis report 131 of the analysis target (S32).

Subsequently, the information processing apparatus 1 extracts the analysis item and texts from the new analysis report 131 created in the processing of S32 (S33). Then, the information processing apparatus 1 refers to the information storage area 130 that stores the piece of pattern information 137 and identifies the analysis technique corresponding to the trigger pattern 135 including the analysis item and the text extracted in the processing of S33 in the trigger patterns 135 identified in the processing of S22 (S34).

Moreover, the information processing apparatus 1 carries out analysis of the analysis target by the analysis technique identified in the processing of S34 (S35). Then, the information processing apparatus 1 outputs the additional report 138 including the analysis result of the analysis carried out in the processing of S35 in association with the new analysis report 131 created in the processing of S32 (S36).

For example, as illustrated in FIG. 10, the information processing apparatus 1 creates the new analysis report 131 of the analysis target and the additional report 138 in response to input of the respective pieces of information regarding an analysis item of the analysis target from the operation terminal 3 and associates the created new analysis report 131 and additional report 138 to store them in the information storage area 130.

For example, it is possible to determine that the analysis pattern 133 including the analysis technique whose appearance frequency is equal to or lower than the threshold has a high possibility of being the option pattern 134 including an additional analysis technique selected by the business operator in the past. For this reason, the information processing apparatus 1 identifies the analysis pattern 133 including the analysis technique whose appearance frequency is equal to or lower than the threshold as the option pattern 134.

Furthermore, it is possible to determine that the trigger pattern 135 that has served as a trigger for carrying out analysis by an additional analysis technique has a high possibility of being included in other analysis patterns 133 included in the same analysis report 131 as the option pattern 134. For this reason, the information processing apparatus 1 identifies, as the trigger patterns 135, the analysis patterns 133 in which the analysis item and the text are common among the analysis reports 131 including the option patterns 134 in the other analysis patterns 133 included in the same analysis reports 131 as the option patterns 134. Then, the information processing apparatus 1 accumulates pieces of pattern information 137 in which the analysis technique included in the identified option patterns 134 is associated with the identified trigger pattern 135.

Due to this, when determining that the trigger pattern 135 corresponding to the new analysis report 131 exists, the information processing apparatus 1 may identify the analysis technique of the option pattern 134 corresponding to the trigger pattern 135 determined to exist as the additional analysis technique by referring to the information storage area 130 in which the pieces of pattern information 137 are accumulated. For this reason, it becomes possible for the information processing apparatus 1 to automatically carry out analysis using the analysis technique included in the template, and besides, analysis using the additional analysis technique when analyzing the analysis target. Therefore, it becomes possible for the business operator to alleviate the burden of work accompanying decision of the additional analysis technique and so forth and to alleviate the burden of work for the analysis of the analysis target.

[Details of First Embodiment]

Next, details of the first embodiment will be described. FIG. 11 to FIG. 16 are flowchart diagrams explaining details of analysis processing in the first embodiment. Furthermore, FIG. 17A to FIG. 28 are diagrams explaining details of analysis processing in the first embodiment.

[Report Accumulation Processing]

First, a description will be made regarding processing of accumulating the analysis reports 131 (hereinafter, referred to also as report accumulation processing) in the analysis processing.

Figure 11:
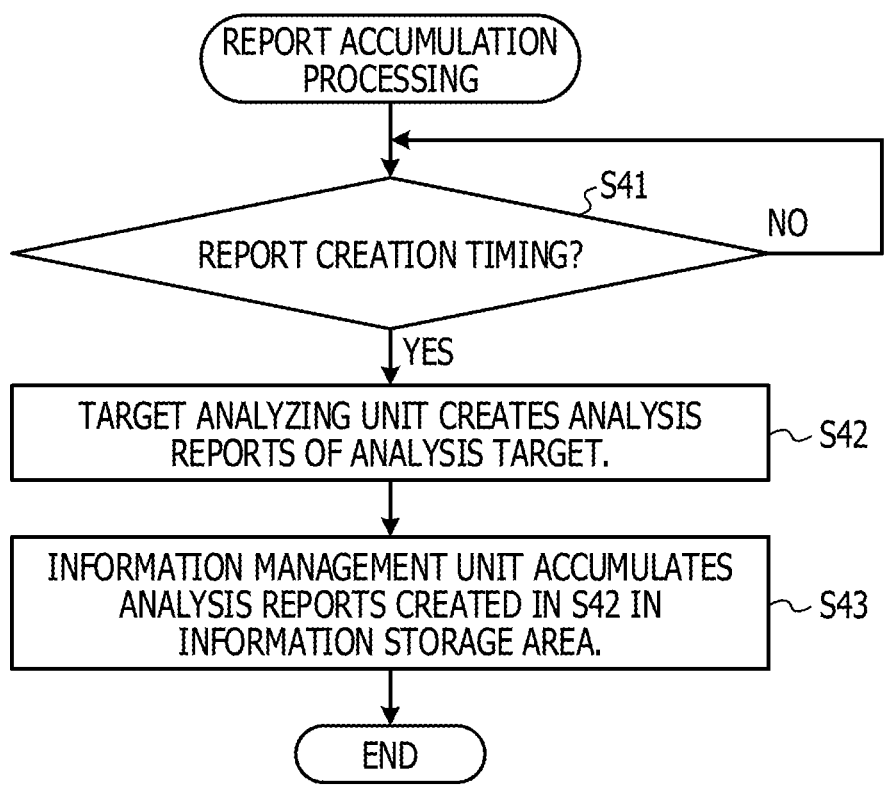
FIG. 11 is a flowchart diagram explaining details of analysis processing in the first embodiment.

As illustrated in FIG. 11, the target analyzing unit 111 of the information processing apparatus 1 waits until the report creation timing (NO of S41). Then, if the report creation timing has come (YES of S41), the target analyzing unit 111 creates the analysis reports 131 of the analysis target (S42). A concrete example of the analysis report 131 will be described below.

[Concrete Example of Analysis Report]

FIGS. 17A to 17D depict diagrams explaining the concrete example of the analysis report 131. For example, FIGS. 17A to 17D are diagrams explaining the analysis reports 131 having a disk I/O as the analysis item and are diagrams explaining the analysis reports 131 created from pieces of information corresponding to periods different from each other.

For example, in the analysis report 131 illustrated in FIG. 17A, "disk I/O" is included as the analysis item, and "load is high over September 1 to September 3," "peak occurs at midnight every day," and "excess of threshold has not occurred" are included as texts representing analysis results. Furthermore, for example, in the analysis report 131 illustrated in FIG. 17C, "disk I/O" is included as the analysis item, and "load is high over February 27 and February 28," "periodicity is not found," "frequency of excess of threshold is high on February 28," and "threshold is exceeded for up to ten minutes" are included as texts representing analysis results. Explanation regarding the other pieces of information included in FIG. 17 is omitted.

Referring back to FIG. 11, the information management unit 112 of the information processing apparatus 1 accumulates the analysis reports 131 created in the processing of S42 in the information storage area 130 (S43). Then, the information processing apparatus 1 ends the report accumulation processing.

[Information Generation Processing]

Next, a description will be made regarding processing of generating the pattern information 137 (hereinafter, referred to also as information generation processing) in the analysis processing.

Figure 12:
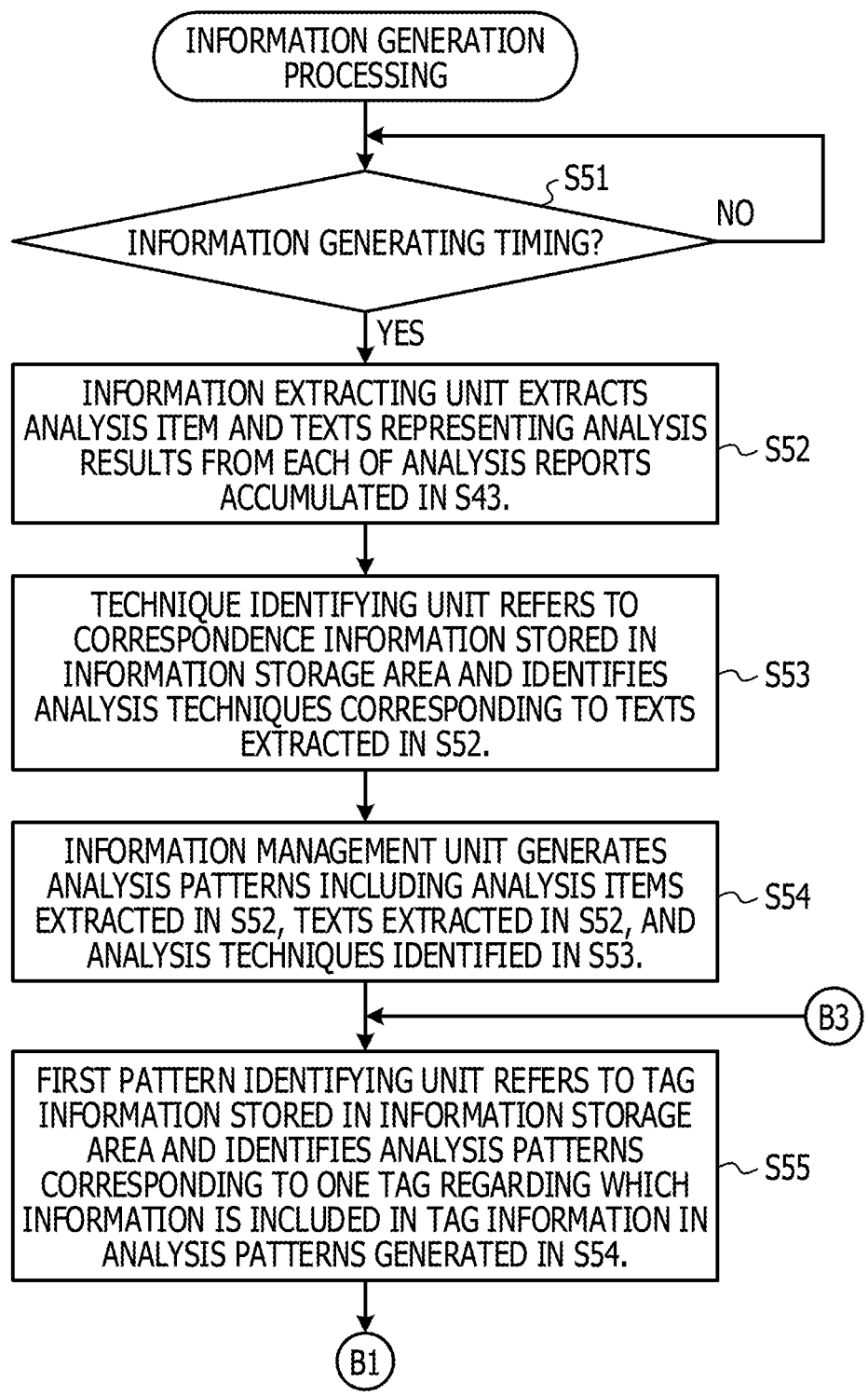
FIG. 12 is a flowchart diagram explaining details of analysis processing in the first embodiment.

As illustrated in FIG. 12, the information extracting unit 113 of the information processing apparatus 1 waits until the information generation timing comes (NO of S51). Then, if the information generation timing has come (YES of S51), the information extracting unit 113 extracts the analysis item and texts representing analysis results from each of the analysis reports 131 accumulated in the processing of S43 (S52).

For example, the information extracting unit 113 refers to the analysis report 131 explained with FIG. 17A to extract "disk I/O" as the analysis item and extract "load is high over September 1 to September 3," "peak occurs at midnight every day," and "excess of threshold has not occurred" as the texts representing analysis results. Furthermore, for example, the information extracting unit 113 refers to the analysis report 131 explained with FIG. 17C to extract "disk I/O" as the analysis item and extract "load is high over February 27 and February 28," "periodicity is not found," "frequency of excess of threshold is high on February 28," and "threshold is exceeded for up to ten minutes" as the texts representing analysis results.

Subsequently, the technique identifying unit 114 of the information processing apparatus 1 refers to the information storage area 130 that stores the correspondence information 132 in which texts are associated with analysis techniques corresponding to the texts and identifies the analysis techniques corresponding to the texts extracted in the processing of S52 (S53). A concrete example of the correspondence information 132 will be described below.

[Concrete Example of Correspondence Information]

FIG. 18 is a diagram explaining the concrete example of the correspondence information 132.

The correspondence information 132 illustrated in FIG. 18 has, as items, "item number" by which each piece of information included in the correspondence information 132 is identified, "text" in which the text included in the analysis report 131 is set, "analysis technique" in which the analysis technique is set, and "analysis ID" in which identification information of the analysis technique is set.

For example, in the correspondence information 132 illustrated in FIG. 18, in the information whose "item number" is "1," "*load is high* on [date]" is set as "text" and "time trend analysis" is set as "analysis technique" and "1" is set as "analysis ID." Furthermore, in the correspondence information 132 illustrated in FIG. 18, for example, in the information whose "item number" is "2," "*peak* at [cycle] [time]" is set as "text" and "cycle analysis" is set as "analysis technique" and "2" is set as "analysis ID." Explanation regarding the other pieces of information included in FIG. 18 is omitted.

[Concrete Example of Processing of S53]

Next, a concrete example of the processing of S53 will be described. FIG. 19A to FIG. 20D are diagrams explaining the concrete example of the processing of S53.

First, in the processing of S53, the technique identifying unit 114 converts each of the texts extracted from the analysis reports 131 explained in FIGS. 17A to 17D as illustrated in FIGS. 19A to 19D.

For example, the technique identifying unit 114 abstracts "load is high over September 1 to September 3," "peak occurs at midnight every day," and "excess of threshold has not occurred" included in the analysis report 131 explained with FIG. 17A and thereby converts them to "load is high over [date]," "peak occurs at [cycle] [clock time]," and "excess of threshold has not occurred," respectively, as illustrated in FIG. 19A.

Furthermore, for example, the technique identifying unit 114 abstracts "load is high over February 27 and February 28," "periodicity is not found," "frequency of excess of threshold is high on February 28," and "threshold is exceeded for up to ten minutes" included in the analysis report 131 explained with FIG. 17C and thereby converts them to "load is high over [date]," "periodicity is not found," "frequency of excess of threshold is high on [date]," and "threshold is exceeded for up to [period]," respectively, as illustrated in FIG. 19C. Explanation regarding the other pieces of information included in FIG. 19 is omitted.

Then, as illustrated in FIGS. 20A to 20D, the technique identifying unit 114 refers to the correspondence information 132 explained with FIG. 18 and identifies the analysis technique corresponding to each of the converted texts.

For example, the technique identifying unit 114 refers to the correspondence information 132 explained with FIG. 18 and identifies each of "time trend analysis," "cycle analysis," and "threshold excess frequency analysis" that are the pieces of information set in "analysis technique" of the pieces of information in which contents corresponding to "load is high over [date]," "peak occurs at [cycle] [clock time]," and "excess of threshold has not occurred," which are the texts explained with FIG. 19A, are set in "text." For example, as illustrated in FIG. 20A, the technique identifying unit 114 identifies each of "time trend analysis," "cycle analysis," and "threshold excess frequency analysis" as the analysis techniques corresponding to the texts included in FIG. 17A.

Furthermore, the technique identifying unit 114 refers to the correspondence information 132 explained with FIG. 18 and identifies each of "time trend analysis," "cycle analysis," "threshold excess frequency analysis," and "threshold excess period analysis" that are the pieces of information set in "analysis technique" of the pieces of information in which contents corresponding to "load is high over [date]," "periodicity is not found," "frequency of excess of threshold is high on [date]," and "threshold is exceeded for up to [period]," which are the texts explained with FIG. 19C, are set in "text." For example, as illustrated in FIG. 20C, the technique identifying unit 114 identifies each of "time trend analysis," "cycle analysis," "threshold excess frequency analysis," and "threshold excess period analysis" as the analysis techniques corresponding to the texts included in FIG. 17C. Explanation regarding the other pieces of information included in FIG. 20 is omitted.

Referring back to FIG. 12, the information management unit 112 generates the analysis patterns 133 including the analysis items extracted in the processing of S52, the texts extracted in the processing of S52, and the analysis techniques identified in the processing of S53 (S54). Then, the information management unit 112 stores the generated analysis patterns 133 in the information storage area 130, for example. A concrete example of the analysis pattern 133 will be described below.

[Concrete Example of Analysis Pattern]

FIG. 21 is a diagram explaining the concrete example of the analysis pattern 133. For example, FIG. 21 is a diagram explaining the concrete example of the analysis pattern 133 corresponding to each piece of information included in the analysis patterns 133 explained with FIG. 17A to FIG. 17D.

The analysis patterns 133 illustrated in FIG. 21 have, as items, "item number" by which each piece of information included in the analysis pattern 133 is identified, "report ID" by which the analysis report 131 accumulated in the processing of S43 is identified, "analysis item" in which the analysis item extracted in the processing of S52 is set, and "text" in which the text extracted in the processing of S52 is set. Furthermore, the analysis patterns 133 illustrated in FIG. 21 have, as items, "analysis ID" in which identification information of the analysis technique is set and "analysis pattern ID" by which the combination of pieces of information set in "analysis item," "text," and "analysis ID" is identified. In the following, explanation will be made based on the assumption that the analysis patterns 133 whose "report ID" is "1" to "4" correspond to the analysis reports 131 explained with FIGS. 17A to 17D, respectively.

For example, in the analysis patterns 133 illustrated in FIG. 21, in the information whose "item number" is "1," "1" is set as "report ID" and "disk I/O" is set as "analysis item" and "load is high over [date]" is set as "text." In addition, "1" is set as "analysis ID" and "1" is set as "analysis pattern ID."

Furthermore, in the analysis patterns 133 illustrated in FIG. 21, in the information whose "item number" is "2," "1" is set as "report ID" and "disk I/O" is set as "analysis item" and "peak occurs at [cycle] [clock time]" is set as "text." In addition, "2" is set as "analysis ID" and "2" is set as "analysis pattern ID." Explanation regarding the other pieces of information included in FIG. 21 is omitted.

Referring back to FIG. 12, the first pattern identifying unit 115 of the information processing apparatus 1 refers to the tag information 136 stored in the information storage area 130 and identifies the analysis patterns 133 corresponding to one tag (hereinafter, referred to also as type) regarding which information is included in the tag information 136 in the analysis patterns 133 generated in the processing of S54 (S55). A concrete example of the tag information 136 will be described below.

[Concrete Example of Tag Information]

FIG. 22 is a diagram explaining the concrete example of the tag information 136.

The tag information 136 illustrated in FIG. 22 has, as items, "item number" by which each piece of information included in the tag information 136 is identified and "use purpose" and "business type" in which the use purpose and business type of the analysis target (information processing system) are set. Hereinafter, the combination of the pieces of information set in "use purpose" and "business type" will be referred to also as tag.

For example, in the tag information 136 illustrated in FIG. 22, in the information whose "item number" is "1," "monitoring" is set as "use purpose" and "intra-company system" is set as "business type." Furthermore, in the tag information 136 illustrated in FIG. 22, in the information whose "item number" is "2," "coping with failure" is set as "use purpose" and "online shop" is set as "business type." Explanation regarding the other pieces of information included in FIG. 22 is omitted.

Thus, for example, if the tag of the analysis target corresponding to the analysis patterns 133 explained in FIG. 21 is only the combination of "monitoring" and "intra-company system," the first pattern identifying unit 115 identifies all pieces of information included in the analysis patterns 133 explained with FIG. 21 in the processing of S55 (processing of S55 executed as the first round).

The tag information 136 may be what has either one item of "use purpose" and "business type" for example. In this case, the first pattern identifying unit 115 may identify the analysis patterns 133 while employing information set in "use purpose" or information set in "business type" as the tag.

Furthermore, the tag information 136 may be what has "user information" by which the user offered the service (service of analyzing the analysis target) by the business operator is identified, for example. In this case, the first pattern identifying unit 115 may identify the analysis patterns 133 while employing information set in "user information" as the tag.

Figure 13:
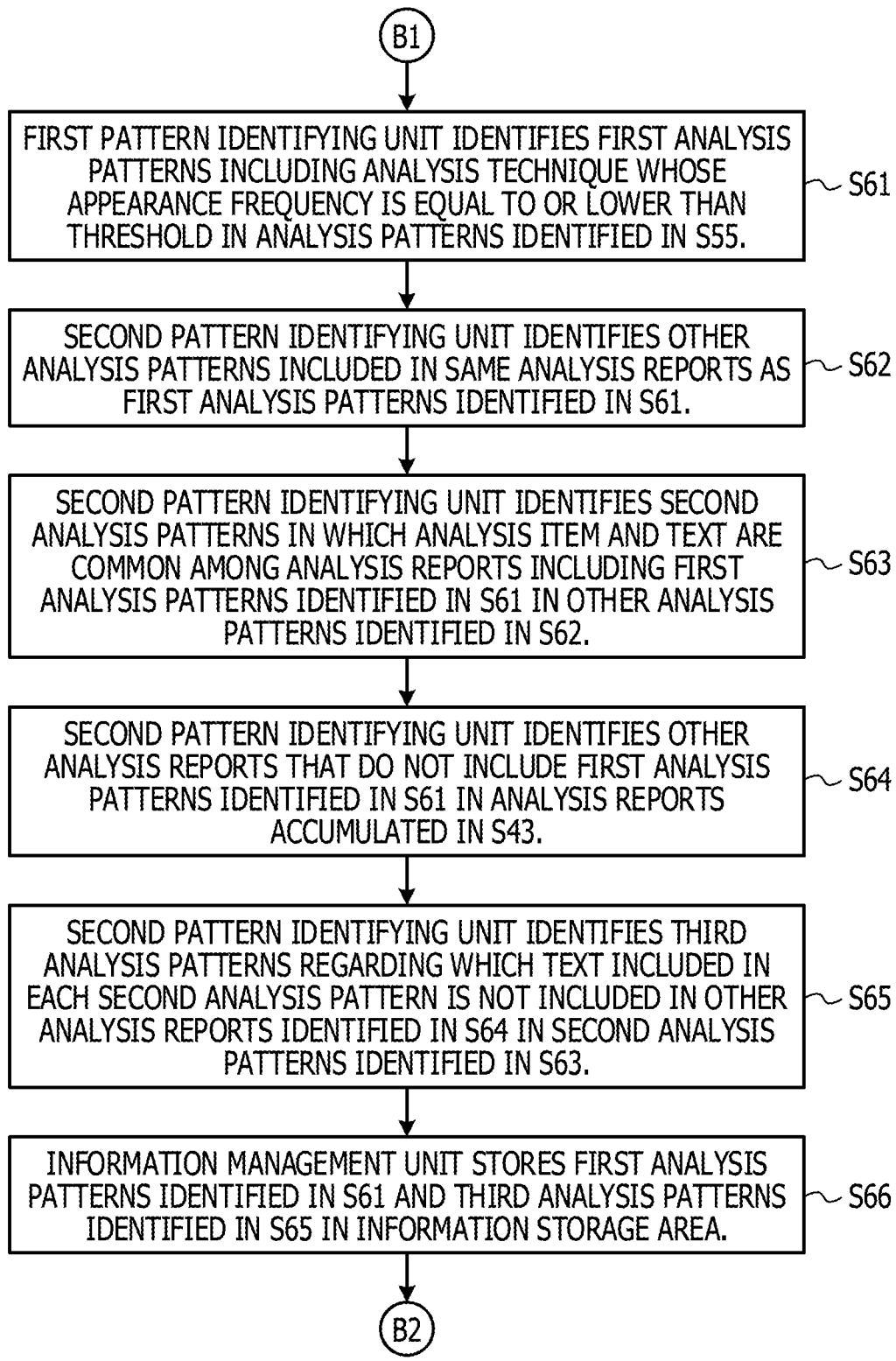
FIG. 13 is a flowchart diagram explaining details of analysis processing in the first embodiment.

Referring to FIG. 13, the first pattern identifying unit 115 identifies the option patterns 134 (first analysis patterns 134) including the analysis technique whose appearance frequency is equal to or lower than a threshold in the analysis patterns 133 identified in the processing of S55 (S61). Thereafter, the information management unit 112 stores the identified option patterns 134 in the information storage area 130, for example.

For example, it is possible to determine that the analysis pattern 133 including the analysis technique whose appearance frequency is equal to or lower than the threshold has a high possibility of being the option pattern 134 including an additional analysis technique selected by the business operator in the past. For this reason, the first pattern identifying unit 115 identifies the analysis pattern 133 including the analysis technique whose appearance frequency is equal to or lower than the threshold as the option pattern 134 in the processing of S61.

For example, the first pattern identifying unit 115 refers to the analysis patterns 133 explained with FIG. 21 and identifies four times, four times, four times, and two times as the appearance frequencies (numbers of times of appearance) of the analysis patterns 133 in which "1," "2," "3," and "4," respectively, are set in "analysis ID." Then, for example, if the threshold in the processing of S61 is two times, the first pattern identifying unit 115 identifies the analysis patterns 133 in which "4" is set in "analysis ID" as the option patterns 134 including the analysis technique whose appearance frequency is equal to or lower than the threshold. A concrete example of the option pattern 134 will be described below.

[Concrete Example of Option Pattern]

FIG. 23 is a diagram explaining the concrete example of the option pattern 134.

The option pattern 134 illustrated in FIG. 23 has, as items, "item number" by which each piece of information included in the option pattern 134 is identified, "analysis item" in which the analysis item extracted in the processing of S52 is set, and "text" in which the text extracted in the processing of S52 is set. Furthermore, the option pattern 134 illustrated in FIG. 23 has, as items, "analysis ID" in which the analysis ID of the analysis patterns 133 including the information set in "analysis item" and the information set in "text" is set and "registration date" in which the registration date of each option pattern 134 is set.

For example, in the option pattern 134 illustrated in FIG. 23, in the information whose "item number" is "1," "4" is set as "analysis ID" and "disk I/O" is set as "analysis item." In addition, "threshold is exceeded for up to [period]" is set as "text" and "2017/10/01" is set as "registration date."

In the processing of S61, for example, the first pattern identifying unit 115 may refer to the analysis reports 131 created at the time of execution of past analysis in the same analysis target (for example, analysis reports 131 corresponding to past several times of analysis) and identify the analysis pattern 133 including the analysis technique whose appearance frequency is equal to or lower than the threshold as the option patterns 134.

Furthermore, in the processing of S61, for example, the first pattern identifying unit 115 may identify the analysis pattern 133 that has been identified as the option pattern 134 at the time of execution of past analysis as the option pattern 134 also in the analysis processing of the present time.

Referring back to FIG. 13, the second pattern identifying unit 116 of the information processing apparatus 1 identifies other analysis patterns 133 included in the same analysis reports 131 as the option patterns 134 identified in the processing of S61 (S62).

For example, in the analysis patterns 133 explained with FIG. 21, the analysis patterns 133 in which "4" is set in "analysis ID" are the analysis patterns 133 whose "item number" is "10" and "14." Furthermore, in the analysis patterns 133 explained with FIG. 21, the pieces of information set in "report ID" of the analysis patterns 133 whose "item number" is "10" and "14" are "3" and "4," respectively. Moreover, in the analysis patterns 133 explained with FIG. 21, the analysis patterns 133 in which "3" is set in "report ID" are the analysis patterns 133 whose "item number" is "7" to "10," and the analysis patterns 133 in which "4" is set in "report ID" are the analysis patterns 133 whose "item number" is "11" to "14."

Thus, the second pattern identifying unit 116 identifies the analysis patterns 133 whose "item number" is "7" to "9" and the analysis patterns 133 whose "item number" is "11" to "13" as the other analysis patterns 133 in the processing of S62.

Then, the second pattern identifying unit 116 identifies the trigger patterns 135 (second analysis patterns 135) in which the analysis item and the text are common among the analysis reports 131 including the option patterns 134 identified in the processing of S61 in the other analysis patterns 133 identified in the processing of S62 (S63).

For example, it is possible to determine that the trigger pattern 135 that has served as a trigger for carrying out analysis by an additional analysis technique has a high possibility of being included in other analysis patterns 133 included in the same analysis report 131 as the option pattern 134. For this reason, in the processing of S63, the second pattern identifying unit 116 identifies, as the trigger patterns 135, the analysis patterns 133 in which the analysis item and the text are common among the analysis reports 131 including the option patterns 134 in the other analysis patterns 133 included in the same analysis reports 131 as the option patterns 134.

For example, in the analysis patterns 133 explained with FIG. 21, when, in the other analysis patterns 133 identified in the processing of S62, the analysis patterns 133 whose "report ID" is "3" (analysis patterns 133 whose "item number" is "7" to "9") and the analysis patterns 133 whose "report ID" is "4" (analysis patterns 133 whose "item number" is "11" to "13") are compared, the combinations of the analysis patterns 133 in which the pieces of information set in "analysis item" and "text" are common are the combination of the analysis patterns 133 whose "item number" is "7" and "11" and the combination of the analysis patterns 133 whose "item number" is "9" and "13."

Thus, the second pattern identifying unit 116 identifies the combination of the analysis patterns 133 whose "item number" is "7" and "11" and the combination of the analysis patterns 133 whose "item number" is "9" and "13" in the processing of S63, for example. A concrete example of the trigger pattern 135 identified in the processing of S63 will be described below.

[Concrete Example (1) of Trigger Pattern]

FIG. 24 and FIG. 25 are diagrams explaining concrete examples of the trigger pattern 135. For example, FIG. 24 is a diagram explaining the concrete example of the trigger pattern 135 identified in the processing of S63.

The trigger patterns 135 illustrated in FIG. 24 and so forth include the same items as the analysis patterns 133 explained with FIG. 21.

For example, in the trigger patterns 135 illustrated in FIG. 24, in the information whose "item number" is "1," "3" and "4" are set as "report ID" and "disk I/O" is set as "analysis item" and "load is high over [date]" is set as "text." In addition, "1" is set as "analysis ID" and "1" is set as "analysis pattern ID."

Furthermore, in the trigger patterns 135 illustrated in FIG. 24, in the information whose "item number" is "2," "3" and "4" are set as "report ID" and "disk I/O" is set as "analysis item" and "frequency of excess of threshold is high on [date]" is set as "text." In addition, "3" is set as "analysis ID" and "5" is set as "analysis pattern ID."

Referring back to FIG. 13, the second pattern identifying unit 116 identifies other analysis reports 131 that do not include the option patterns 134 identified in the processing of S61 in the analysis reports 131 accumulated in the processing of S43 (S64).

For example, in the trigger patterns 135 explained with FIG. 24, "3" and "4" are set in "report ID" of the pieces of information whose "item number" is "1" and "2." Thus, the second pattern identifying unit 116 identifies the analysis reports 131 whose "report ID" is "1" and "2" as the other analysis reports 131.

Then, the second pattern identifying unit 116 identifies the trigger patterns 135 (third analysis patterns 135) regarding which the text included in each trigger pattern 135 is not included in the other analysis reports 131 identified in the processing of S64 in the trigger patterns 135 identified in the processing of S63 (S65).

For example, the second pattern identifying unit 116 determines the trigger patterns 135 regarding which the same text is not included in the other analysis reports 131 identified in the processing of S64 in the trigger patterns 135 identified in the processing of S63 as the trigger patterns 135 having a higher possibility of having served as a trigger for carrying out analysis by an additional analysis technique in the past. Then, as described later, the information processing apparatus 1 executes processing to be described later by using only the trigger patterns 135 having a higher possibility of having served as a trigger for carrying out analysis by an additional analysis technique in the past, for example.

This allows the information processing apparatus 1 to further alleviate the load of processing accompanying execution of the analysis processing. A concrete example of the trigger pattern 135 identified in the processing of S65 will be described below.

[Concrete Example (2) of Trigger Pattern]

FIG. 25 is a diagram explaining the concrete example of the trigger pattern 135 identified in the processing of S65.

For example, in the analysis patterns 133 whose "report ID" is "1" and "2" in the analysis patterns 133 explained with FIG. 21, the analysis patterns 133 including the same contents as the trigger pattern 135 whose "item number" is "1" in the trigger patterns 135 explained with FIG. 24 (analysis patterns 133 whose "item number" is "1" and "4") are included. On the other hand, in the analysis patterns 133 whose "report ID" is "1" and "2" in the analysis patterns 133 explained with FIG. 21, the analysis pattern 133 including the same contents as the trigger pattern 135 whose "item number" is "2" in the trigger patterns 135 explained with FIG. 24 is not included.

Thus, in the processing of S65, the second pattern identifying unit 116 identifies only the trigger pattern 135 whose "item number" is "2" in the trigger patterns 135 explained with FIG. 24 as illustrated in FIG. 25.

Referring back to FIG. 13, the information management unit 112 stores the option patterns 134 identified in the processing of S61 and the trigger patterns 135 identified in the processing of S65 in the information storage area 130 (S66).

Figure 14:
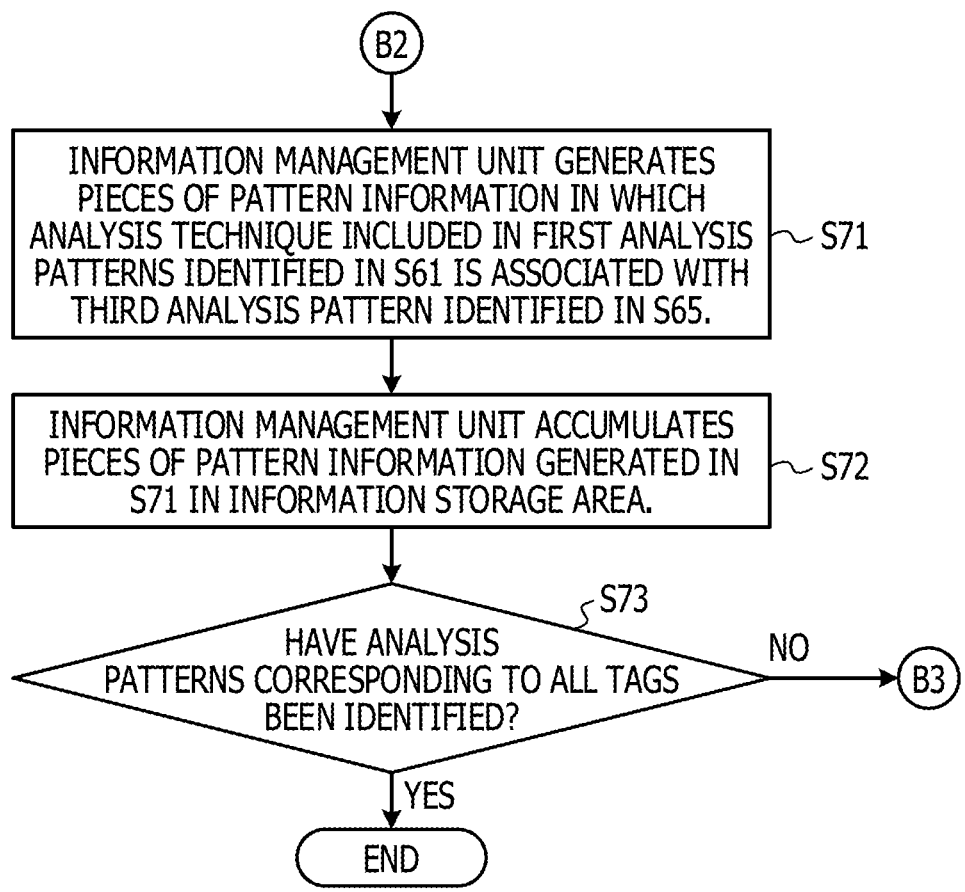
FIG. 14 is a flowchart diagram explaining details of analysis processing in the first embodiment.

Then, as illustrated in FIG. 14, the information management unit 112 generates pieces of pattern information 137 in which the analysis technique included in the option patterns 134 identified in the processing of S61 is associated with the trigger pattern 135 identified in the processing of S65 (S71).

For example, the information management unit 112 associates the option pattern 134 in which the additional analysis technique selected in the past is included and the trigger pattern 135 that has served as the trigger for carrying out analysis by the additional analysis technique.

Then, the information management unit 112 accumulates the pieces of pattern information 137 generated in the processing of S71 in the information storage area 130 (S72). A concrete example of the pattern information 137 will be described below.

[Concrete Example of Pattern Information]

FIG. 26 is a diagram explaining the concrete example of the pattern information 137.

The pattern information 137 illustrated in FIG. 26 has, as items, "item number" by which each piece of information included in the pattern information 137 is identified, "use purpose" and "business type" included in the tag information 136, and "option pattern ID" corresponding to "analysis ID" included in the option pattern 134. Furthermore, the pattern information 137 illustrated in FIG. 26 has, as items, "trigger pattern ID" corresponding to "analysis ID pattern" included in the trigger pattern 135 and "registration date" in which the registration date of each piece of pattern information 137 is set.

For example, in the option pattern 134 explained with FIG. 23, "4" is set in "analysis ID" of the option pattern 134 whose "item number" is "1." Furthermore, in the trigger pattern 135 explained with FIG. 25, "5" is set in "analysis pattern ID" of the trigger pattern 135 whose "item number" is "2."

Thus, as illustrated in FIG. 26, for example, the information management unit 112 sets "monitoring" in "use purpose" in the information whose "item number" is "1" and sets "intra-company system" in "business type" and sets "4" in "option pattern ID." In addition, the information management unit 112 sets "5" in "trigger pattern ID" and sets "2017/10/01" in "registration date."

If the pattern information 137 with the same contents as the pattern information 137 generated in the processing of S71 has been already accumulated in the information storage area 130, the information management unit 112 does not have to accumulate the pattern information 137 generated in the processing of S71.

If the pattern information 137 that is identical to the pattern information 137 generated in the processing of S71 in the information set in "option pattern ID" and is different in the information set in "trigger pattern ID" and the pattern information 137 with the same contents as the pattern information 137 generated in the processing of S71 have been already accumulated in the information storage area 130, the information management unit 112 may delete the pattern information 137 that is identical to the pattern information 137 generated in the processing of S71 in the information set in "option pattern ID" and is different in the information set in "trigger pattern ID" for example. For example, in the case in which the information generation processing is executed in units of analysis patterns 133 corresponding to each tag, if the pattern information 137 different from the pattern information 137 generated in the processing of S71 in only the information set in "trigger pattern ID" in "use purpose," "business type," "option pattern ID," and "trigger pattern ID" and the pattern information 137 with the same contents as the pattern information 137 generated in the processing of S71 have been already accumulated, the information management unit 112 may delete the pattern information 137 different from the pattern information 137 generated in the processing of S71 in only the information set in "trigger pattern ID."

Furthermore, for example, the information management unit 112 may accumulate the pattern information 137 generated in the processing of S71 if the pattern information 137 that is identical to the pattern information 137 generated in the processing of S71 in the information set in "option pattern ID" and is different in the information set in "trigger pattern ID" has been already accumulated in the information storage area 130 and the pattern information 137 with the same contents as the pattern information 137 generated in the processing of S71 has not been accumulated in the information storage area 130. For example, in the case in which the information generation processing is executed in units of analysis patterns 133 corresponding to each tag, the information management unit 112 may accumulate the pattern information 137 generated in the processing of S71 if the pattern information 137 different from the pattern information 137 generated in the processing of S71 in only the information set in "trigger pattern ID" in "use purpose," "business type," "option pattern ID," and "trigger pattern ID" has been already accumulated and the pattern information 137 with the same contents as the pattern information 137 generated in the processing of S71 has not been accumulated.

Moreover, the information management unit 112 may determine whether or not plural pieces of pattern information 137 that are identical in the information set in "option pattern ID" and are different in the information set in "trigger pattern ID" have been accumulated in the information storage area 130 at periodic timings, for example. For example, in the case in which the information generation processing is executed in units of analysis patterns 133 corresponding to each tag, the information management unit 112 may determine whether or not plural pieces of pattern information 137 different in only the information set in "trigger pattern ID" in "use purpose," "business type," "option pattern ID," and "trigger pattern ID" have been accumulated. Furthermore, if determining that plural pieces of pattern information 137 that are identical in the information set in "option pattern ID" and are different in the information set in "trigger pattern ID" have been accumulated in the information storage area 130, the information management unit 112 may delete the pieces of pattern information 137 regarding which the number of times of generation in the processing of S71 is equal to or smaller than a threshold at the time of execution of past analysis in the same analysis target (at the time of execution of past several times of analysis). Moreover, in this case, the information management unit 112 may delete the pieces of pattern information 137 other than the pattern information 137 regarding which the number of times of generation in the processing of S71 is the largest.

This allows the information processing apparatus 1 to further alleviate the load of processing accompanying execution of the analysis processing.

Referring back to FIG. 14, the first pattern identifying unit 115 determines whether or not the analysis patterns 133 corresponding to all tags included in the tag information 136 stored in the information storage area 130 have been identified in the processing of S55 (S73).

If determining that the analysis patterns 133 corresponding to all tags included in the tag information 136 have not been identified as a result (NO of S73), the first pattern identifying unit 115 and so forth execute the processing of S55 and the subsequent processing again.

On the other hand, if determining that the analysis patterns 133 corresponding to all tags included in the tag information 136 have been identified (YES of S73), the information processing apparatus 1 ends the information generation processing.

[Report Addition Processing]

Next, a description will be made regarding processing of creating the additional report 138 (hereinafter, referred to also as report addition processing) in the analysis processing.

Figure 15:
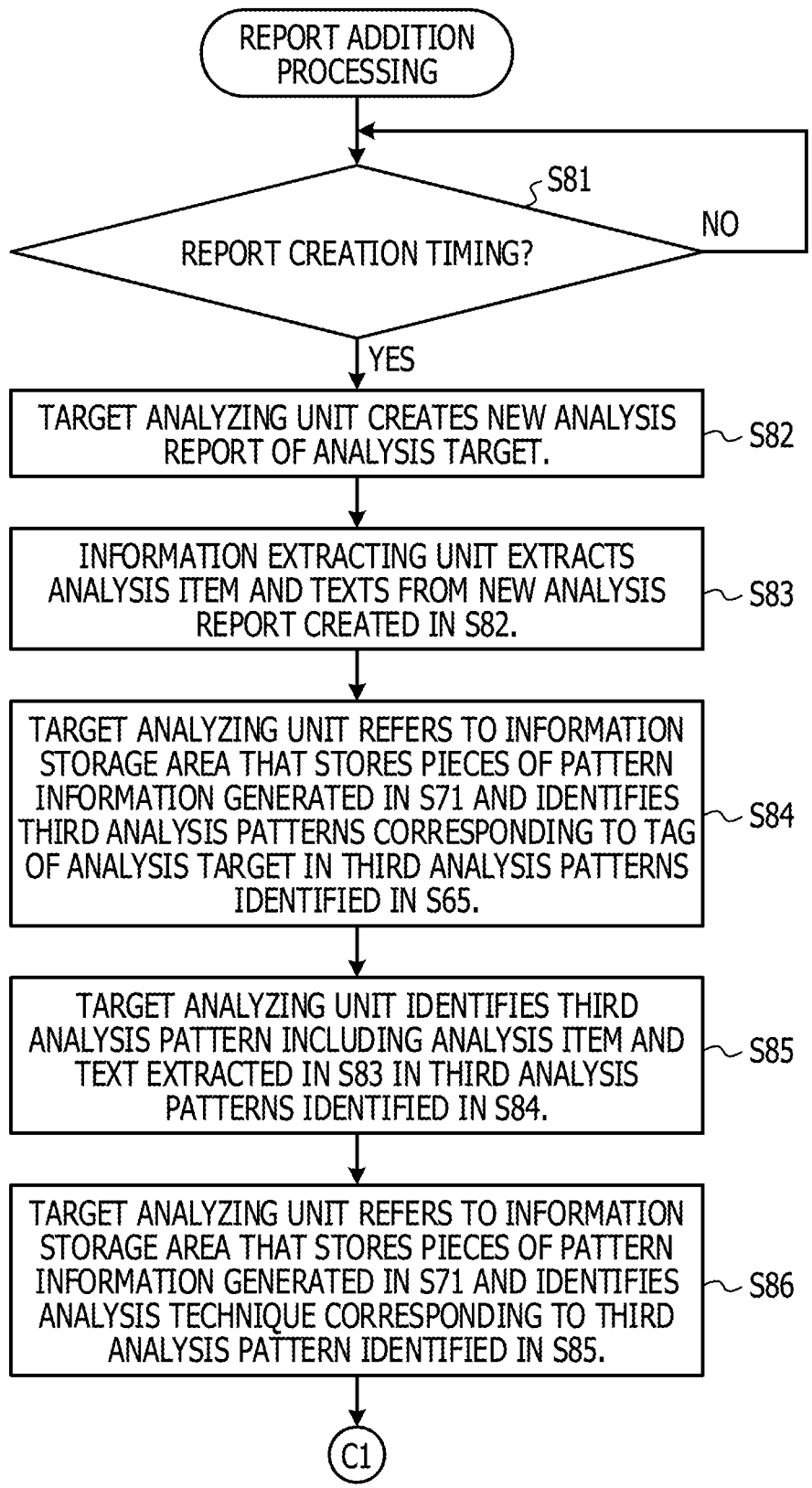
FIG. 15 is a flowchart diagram explaining details of analysis processing in the first embodiment.

As illustrated in FIG. 15, the target analyzing unit 111 waits until the report creation timing (NO of S81). Then, if the report creation timing has come (YES of S81), the target analyzing unit 111 creates the new analysis report 131 of the analysis target (S82).

For example, as illustrated in FIG. 27A, the target analyzing unit 111 generates the new analysis report 131 in which the analysis item is "disk I/O" and texts representing analysis results are "load is high on August 20," "periodicity is not found," and "frequency of excess of threshold is high on August 20."

Then, the information extracting unit 113 extracts the analysis item and texts from the new analysis report 131 created in the processing of S82 (S83).

For example, the information extracting unit 113 extracts "disk I/O" as the analysis item. Furthermore, for example, as illustrated in FIG. 27B, the information extracting unit 113 abstracts and converts "load is high on August 20," "periodicity is not found," and "frequency of excess of threshold is high on August 20" and thereby identifies "load is high over [date]," "periodicity is not found," and "frequency of excess of threshold is high on [date]" as the texts representing the analysis results.

Subsequently, the target analyzing unit 111 refers to the information storage area 130 that stores the pieces of pattern information 137 generated in the processing of S71 and identifies the trigger patterns 135 corresponding to the tag of the analysis target in the trigger patterns 135 identified in the processing of S65 (S84).

Then, the target analyzing unit 111 identifies the trigger pattern 135 including the analysis item and the text extracted in the processing of S83 in the trigger patterns 135 identified in the processing of S84 (S85).

Moreover, the target analyzing unit 111 refers to the information storage area 130 that stores the pieces of pattern information 137 generated in the processing of S71 and identifies the analysis technique corresponding to the trigger pattern 135 identified in the processing of S85 (S86).

For example, the target analyzing unit 111 identifies the trigger pattern 135 having the same analysis item and text as the new analysis report 131 and identifies the analysis technique corresponding to the identified trigger pattern 135 as the additional analysis technique.

Figure 16:
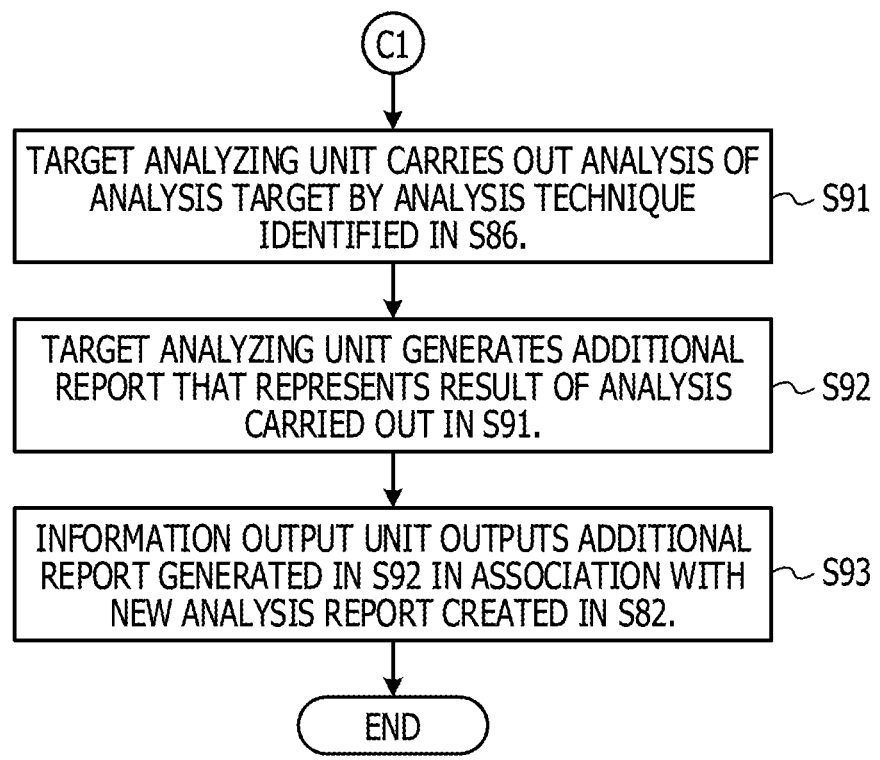
FIG. 16 is a flowchart diagram explaining details of analysis processing in the first embodiment.

Subsequently, as illustrated in FIG. 16, the target analyzing unit 111 carries out analysis of the analysis target by the analysis technique identified in the processing of S86 (S91). For example, if the analysis technique is identified in the processing of S86, the target analyzing unit 111 carries out analysis of the analysis target by the identified analysis technique. Then, the target analyzing unit 111 generates the additional report 138 that represents the result of the analysis carried out in the processing of S91 (S92).

Thereafter, the information output unit 117 of the information processing apparatus 1 outputs the additional report 138 generated in the processing of S92 in association with the new analysis report 131 created in the processing of S82 (S93).

For example, as illustrated in FIG. 28, the information output unit 117 carries out the output to the operation terminal 3 or the like in the form in which "threshold is exceeded for up to 15 minutes" that is the contents of the additional report 138 generated in the processing of S92 is added to the new analysis report 131 explained with FIG. 27A.

As above, the information processing apparatus 1 in the present embodiment accumulates the analysis reports 131 relating to the analysis target in the information storage area 130 and extracts the analysis item and texts representing analysis results included in the analysis report 131 from each of the accumulated analysis reports 131.

Then, the information processing apparatus 1 refers to the information storage area 130 that stores the correspondence information 132 in which texts are associated with analysis techniques corresponding to the texts and identifies the analysis techniques corresponding to the extracted texts to generate the analysis patterns 133 including the extracted analysis items, the extracted texts, and the identified analysis techniques.

Subsequently, the information processing apparatus 1 identifies the option patterns 134 including the analysis technique whose appearance frequency is equal to or lower than the threshold in the generated analysis patterns 133. Then, the information processing apparatus 1 identifies other analysis patterns 133 included in the same analysis reports 131 as the identified option patterns 134 and identifies the trigger patterns 135 in which the analysis item and the text are common among the analysis reports 131 including the identified option patterns 134 in the identified other analysis patterns 133. Moreover, the information processing apparatus 1 accumulates, in the information storage area 130, pieces of pattern information 137 in which the identified option pattern 134 is associated with the identified trigger pattern 135.

Thereafter, in response to acceptance of the new analysis report 131, the information processing apparatus 1 extracts the analysis item and texts from the new analysis report 131. Then, the information processing apparatus 1 refers to the information storage area 130 that stores the accumulated pieces of pattern information 137 and identifies the option pattern 134 corresponding to the trigger pattern 135 including the extracted analysis item and text in the identified trigger patterns 135. Moreover, the information processing apparatus 1 outputs the analysis result of the analysis target based on the analysis technique included in the identified option pattern 134 in association with the new analysis report 131.

For example, it is possible to determine that the analysis pattern 133 including the analysis technique whose appearance frequency is equal to or lower than the threshold has a high possibility of being the option pattern 134 including an additional analysis technique selected by the business operator in the past. For this reason, the information processing apparatus 1 identifies the analysis pattern 133 including the analysis technique whose appearance frequency is equal to or lower than the threshold as the option pattern 134.

Furthermore, it is possible to determine that the trigger pattern 135 that has served as a trigger for carrying out analysis by an additional analysis technique has a high possibility of being included in other analysis patterns 133 included in the same analysis report 131 as the option pattern 134. For this reason, the information processing apparatus 1 identifies, as the trigger patterns 135, the analysis patterns 133 in which the analysis item and the text are common among the analysis reports 131 including the option patterns 134 in the other analysis patterns 133 included in the same analysis reports 131 as the option patterns 134. Then, the information processing apparatus 1 accumulates pieces of pattern information 137 in which the analysis technique included in the identified option patterns 134 is associated with the identified trigger pattern 135.

Due to this, when determining that the trigger pattern 135 corresponding to the new analysis report 131 exists, the information processing apparatus 1 may identify the analysis technique of the option pattern 134 corresponding to the trigger pattern 135 determined to exist as the additional analysis technique by referring to the information storage area 130 in which the pieces of pattern information 137 are accumulated. For this reason, it becomes possible for the information processing apparatus 1 to automatically carry out analysis using the analysis technique included in the template, and besides, analysis using the additional analysis technique when analyzing the analysis target. Therefore, it becomes possible for the business operator to alleviate the burden of work accompanying decision of the additional analysis technique and so forth and to alleviate the burden of work for the analysis of the analysis target.

When creating a given number of new analysis reports 131, the information processing apparatus 1 may execute information generation processing regarding the created new analysis reports 131 and carry out accumulation of pieces of pattern information 137 again.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer implemented method of analysis, the method comprising:
executing, by one or more computer processors, first accumulation processing that includes accumulating analysis reports in a storage device, each of the analysis reports being a report generated by the one or more computer processors using any one of a plurality of predefined templates, each of the analysis reports including an analysis item regarding an analysis target and analysis results with respect to the analysis item;

executing, by the one or more computer processors, first extraction processing that includes extracting, from each of the analysis reports accumulated, the analysis item and texts, each of the extracted texts including a character sequence representing an individual result of the analysis results;

executing, by the one or more computer processors, first identification processing that includes converting the texts extracted from each of the analysis reports into converted texts by replacing a part of each of the extracted texts with any one of a plurality of predetermined text labels each of which includes a predetermined wording, and obtaining, for a respective text of the converted texts from each analysis report, an analysis technique corresponding to the respective text by using correspondence information indicating a relationship between each text of the converted texts and a corresponding analysis technique;

executing, by the one or more computer processors, generation processing that includes generating, for the respective text extracted from each analysis report, an analysis pattern including: the analysis item extracted, the respective text extracted, and the analysis technique identified, the generated analysis pattern being associated with the each analysis report;

executing, by the one or more computer processors, second identification processing that includes calculating appearance frequency of each analysis technique in a plurality of analysis patterns obtained by the generation processing performed for the respective text of each analysis report, obtaining, for each analysis technique in the plurality of analysis patterns, a determination result by determining whether the calculated appearance frequency of that analysis technique is equal to or lower than a threshold, and in response to the determination result indicating that the calculated appearance frequency of that analysis technique is equal to or lower than the threshold, obtaining, as a first analysis pattern from among the plurality of analysis patterns an analysis pattern including that analysis technique;

executing, by the one or more computer processors, third identification processing that includes obtaining other analysis patterns from each analysis report associated with the first analysis pattern, the other analysis patterns being analysis patterns associated with the each analysis report same as the first analysis pattern, the other analysis patterns being analysis patterns other than the first analysis pattern among analysis patterns associated with the each analysis report same as the first analysis pattern, obtaining second analysis patterns from among the other analysis patterns, each of the second analysis patterns being an analysis pattern having a same pair of the analysis item and the text among analysis reports associated with the first analysis pattern, and obtaining other analysis reports from among the accumulated analysis reports in the storage device, each of the other analysis reports being an analysis report that does not includes an analysis pattern same as the first analysis pattern;

in response that at least any one of the second analysis patterns is not included in each of the other analysis reports, executing, by the one or more computer processors, second accumulation processing that includes generating pattern information indicating a relationship between the analysis technique corresponding to the first analysis patterns and the at least any one of the second analysis patters, and accumulating the generated pattern information in the storage device;

executing, by the one or more computer processors, second extraction processing that includes extracting, in response to acceptance of a new analysis report, the analysis item and the texts from the new analysis report; and executing, by the one or more computer processors, output processing that includes identifying a new analysis technique corresponding to the second analysis patterns by using the pattern information accumulated in the storage device in case that the analysis item and the texts extracted from the new analysis report are respectively equal to the analysis item and the text included in each of the second analysis patterns, and outputting an analysis result of the analysis target by performing the identified new analysis technique on that analysis target, to accumulate the new analysis report in the storage device in conjunction with the analysis result obtained by the performing of the identified new analysis technique.

2. The analysis method according to claim 1, further comprising:

executing fourth identification processing that includes identifying third analysis reports from among the accumulated analysis reports, each of the third analysis reports being an analysis report that is not associated with the first analysis patterns, and wherein the identifying of the second analysis patterns is configured to identify the second analysis patterns from among the other analysis patterns, each of the second analysis patterns being an analysis pattern having the same pair of the analysis item and the text among analysis reports associated with the first analysis pattern, the text included in each of the second analysis patterns being different from the text included in each analysis report associated with the identified third analysis report.

3. The analysis method according to claim 1, wherein the second accumulation processing is configured to avoid accumulation of the pattern information including the first analysis pattern identified and the second analysis pattern identified when the pattern information including the first analysis pattern identified and the second analysis pattern identified has been already accumulated.

4. The analysis method according to claim 1, wherein the second accumulation processing is configured to delete the pattern information that includes the first analysis pattern identified and does not include the second analysis pattern identified from the storage device when first pattern information and second pattern information have been already accumulated, the first pattern information being the pattern information that includes the first analysis pattern identified and the second analysis pattern identified, the second pattern information being the pattern information that includes the first analysis pattern identified and does not include the second analysis pattern identified.

5. The analysis method according to claim 1, wherein the output processing is configured to
- increase the number of times of generation of the pattern information corresponding to the second analysis pattern including the analysis item and the text extracted by a given number, and
- delete, from the storage device, the pattern information other than the pattern information including the second analysis pattern regarding which the number of times of generation is largest in a plurality of pieces of the pattern information including the first analysis pattern identical when the plurality of pieces of the pattern information have been accumulated in the storage device.

6. The analysis method according to claim 1, wherein the output processing is configured to
- increase the number of times of generation of the pattern information corresponding to the second analysis pattern including the analysis item and the text extracted by a given number, and
- delete, from the storage device, the pattern information other than the pattern information including the second analysis pattern regarding which the number of times of generation is equal to or larger than a threshold in a plurality of pieces of the pattern information including the first analysis pattern identical when the plurality of pieces of the pattern information have been accumulated in the storage device.

7. The analysis method according to claim 1, wherein
- the analysis reports include analysis reports corresponding to each of types of the analysis target,
- the first extraction processing is configured to carry out the extracting regarding each of the analysis reports corresponding to each of the types,
- the first identification processing is configured to carry out the identifying analysis techniques regarding each of the analysis reports corresponding to each of the types,
- the generation processing is configured to carry out the generating analysis patterns regarding each of the analysis reports corresponding to each of the types,
- the second identification processing is configured to carry out the identifying first analysis patterns regarding each of the analysis reports corresponding to each of the types,
- the third identification processing is configured to carry out the identifying second analysis patterns regarding each of the analysis reports corresponding to each of the types,
- the second accumulation processing is configured to carry out the accumulating pattern information regarding each of the analysis reports corresponding to each of the types, and
- the output processing is configured to carry out the outputting an analysis result regarding each of the analysis reports corresponding to each of the types.

8. The analysis method according to claim 7, wherein
the analysis target is an information processing apparatus, and
the types are types of service offered to a user through operation of the information processing apparatus.

9. The analysis method according to claim 7, wherein
the analysis target is an information processing apparatus, and
the types are types of user offered a service through operation of the information processing apparatus.

10. The analysis method according to claim 1, wherein the output processing is configured to, when an analysis technique corresponding to the second analysis pattern including the analysis item and the text extracted is identified, output an analysis result of the analysis target based on the analysis technique identified in association with the new analysis report.

11. An apparatus for analysis, the apparatus comprising:
a memory; and
a processor coupled to the memory; the processor being configured to:
execute first accumulation processing that includes accumulating analysis reports in a storage device, each of the analysis reports being a report generated by the processor using any one of a plurality of predefined templates, each of the analysis reports including an analysis item regarding an analysis target and analysis results with respect to the analysis item;
execute first extraction processing that includes extracting, from each of the analysis reports accumulated, the analysis item and texts, each of the extracted texts including a character sequence representing an individual result of the analysis results;
execute first identification processing that includes
converting the texts extracted from each of the analysis reports into converted texts by replacing a part of each of the extracted texts with any one of a plurality of predetermined text labels each of which includes a predetermined wording, and
obtaining, for a respective text of the converted texts from each analysis report, an analysis technique corresponding to the respective text by using correspondence information indicating a relationship between each text of the converted texts and a corresponding analysis technique;
execute generation processing that includes generating, for the respective text extracted from each analysis report, an analysis pattern including:
the analysis item extracted, the respective text extracted, and the analysis technique identified, the generated analysis pattern being associated with the each analysis report;
execute second identification processing that includes
calculating appearance frequency of each analysis technique in a plurality of analysis patterns obtained by the generation processing performed for the respective text of each analysis report,
obtaining, for each analysis technique in the plurality of analysis patterns, a determination result by determining whether the calculated appearance frequency of that analysis technique is equal to or lower than a threshold, and
in response to the determination result indicating that the calculated appearance frequency of that analysis technique is equal to or lower than the threshold, obtaining, as a first analysis pattern from among the plurality of analysis patterns an analysis pattern including that analysis technique;
execute third identification processing that includes
obtaining other analysis patterns from each analysis report associated with the first analysis pattern, the other analysis patterns being analysis patterns associated with the each analysis report same as the first analysis pattern, the other analysis patterns being analysis patterns other than the first analysis pattern among analysis patterns associated with the each analysis report same as the first analysis pattern, and
obtaining second analysis patterns from among the other analysis patterns, each of the second analysis patterns being an analysis pattern having a same pair of the analysis item and the text among analysis reports associated with the first analysis pattern, and obtaining other analysis reports from among the accumulated analysis reports in the storage device, each of the other analysis reports being an analysis report that does not includes an analysis pattern same as the first analysis pattern;

in response that at least any one of the second analysis patterns is not included in each of the other analysis reports, execute second accumulation processing that includes generating pattern information indicating a relationship between the analysis technique corresponding to the first analysis patterns and the at least any one of the second analysis patters, and accumulating the generated pattern information in the storage device;

execute second extraction processing that includes extracting, in response to acceptance of a new analysis report, the analysis item and the texts from the new analysis report; and execute output processing that includes identifying a new analysis technique corresponding to the second analysis patterns by using the pattern information accumulated in the storage device in case that the analysis item and the texts extracted from the new analysis report are respectively equal to the analysis item and the text included in each of the second analysis patterns, and outputting an analysis result of the analysis target by performing the identified new analysis technique on that analysis target, to accumulate the new analysis report in the storage device in conjunction with the analysis result obtained by the performing of the identified new analysis technique.

12. A non-transitory computer-readable storage medium for storing a program which causes a processor to perform processing for analysis, the processing comprising:

executing first accumulation processing that includes accumulating analysis reports in a storage device, each of the analysis reports being a report generated by the processor using any one of a plurality of predefined templates, each of the analysis reports including an analysis item regarding an analysis target and analysis results with respect to the analysis item;

executing first extraction processing that includes extracting, from each of the analysis reports accumulated, the analysis item and texts, each of the extracted texts including a character sequence representing an individual result of the analysis results;

executing first identification processing that includes converting the texts extracted from each of the analysis reports into converted texts by replacing a part of each of the extracted texts with any one of a plurality of predetermined text labels each of which includes a predetermined wording, and obtaining, for a respective text of the converted texts from each analysis report, an analysis technique corresponding to the respective text by using correspondence information indicating a relationship between each text of the converted texts and a corresponding analysis technique;

executing generation processing that includes generating, for the respective text extracted from each analysis report, an analysis pattern including: the analysis item extracted, the respective text extracted, and the analysis technique identified, the generated analysis pattern being associated with the each analysis report;

executing second identification processing that includes calculating appearance frequency of each analysis technique in a plurality of analysis patterns obtained by the generation processing performed for the respective text of each analysis report, obtaining, for each analysis technique in the plurality of analysis patterns, a determination result by determining whether the calculated appearance frequency of that analysis technique is equal to or lower than a threshold, and in response to the determination result indicating that the calculated appearance frequency of that analysis technique is equal to or lower than the threshold, obtaining, as a first analysis pattern from among the plurality of analysis patterns an analysis pattern including that analysis technique;

executing third identification processing that includes obtaining other analysis patterns from each analysis report associated with the first analysis pattern, the other analysis patterns being analysis patterns associated with the each analysis report same as the first analysis pattern, the other analysis patterns being analysis patterns other than the first analysis pattern among analysis patterns associated with the each analysis report same as the first analysis pattern, and obtaining second analysis patterns from among the other analysis patterns, each of the second analysis patterns being an analysis pattern having a same pair of the analysis item and the text among analysis reports associated with the first analysis pattern, and obtaining other analysis reports from among the accumulated analysis reports in the storage device, each of the other analysis reports being an analysis report that does not includes an analysis pattern same as the first analysis pattern;

in response that at least any one of the second analysis patterns is not included in each of the other analysis reports, executing second accumulation processing that includes generating pattern information indicating a relationship between the analysis technique corresponding to the first analysis patterns and the at least any one of the second analysis patters, and accumulating the generated pattern information in the storage device;

executing second extraction processing that includes extracting, in response to acceptance of a new analysis report, the analysis item and the texts from a new analysis report the new analysis report; and executing output processing that includes identifying a new analysis technique corresponding to the second analysis patterns by using the pattern information accumulated in the storage device in case that the analysis item and the texts extracted from the new analysis report are respectively equal to the analysis item and the text included in each of the second analysis patterns, and outputting an analysis result of the analysis target by performing the identified new analysis technique on that analysis target, to accumulate the new analysis report in the storage device in conjunction with the analysis result obtained by the performing of the identified new analysis technique.

* * * * *